(12) United States Patent
Mathena et al.

(10) Patent No.: US 9,353,586 B2
(45) Date of Patent: May 31, 2016

(54) CONTROL PANEL, AND DIGITAL DISPLAY UNITS AND SENSORS THEREFOR

(71) Applicant: Mathena, Inc., El Reno, OK (US)

(72) Inventors: John Mathena, Edmond, OK (US); Bill Bennett, Yukon, OK (US)

(73) Assignee: MATHENA, INC., El Reno, OK (US)

( * ) Notice: Subject to any disclaimer, the term of this patent is extended or adjusted under 35 U.S.C. 154(b) by 329 days.

(21) Appl. No.: 13/891,425

(22) Filed: May 10, 2013

(65) Prior Publication Data

US 2013/0300568 A1 Nov. 14, 2013

Related U.S. Application Data

(60) Provisional application No. 61/646,056, filed on May 11, 2012, provisional application No. 61/819,329, filed on May 3, 2013.

(51) Int. Cl.
*E21B 21/08* (2006.01)
*G01V 3/18* (2006.01)

(52) U.S. Cl.
CPC .. *E21B 21/08* (2013.01); *G01V 3/18* (2013.01)

(58) Field of Classification Search
CPC ....... E21B 21/08; E21B 34/06; E21B 34/066; E21B 47/00; E21B 47/09; E21B 34/14; E21B 47/06; G06K 17/0022
See application file for complete search history.

(56) References Cited

U.S. PATENT DOCUMENTS

| | | |
|---|---|---|
| 2,166,516 A | 7/1939 | Bainbridge |
| D220,696 S | 5/1971 | Lazzo, III |
| 3,753,336 A | 8/1973 | Drew et al. |
| 3,765,505 A | 10/1973 | Pendleton |
| 3,875,998 A | 4/1975 | Charpentier |
| 3,965,967 A | 6/1976 | Jentzsch et al. |
| 4,154,570 A | 5/1979 | Schwartz |
| 4,294,593 A | 10/1981 | Rehm |

(Continued)

FOREIGN PATENT DOCUMENTS

| | | |
|---|---|---|
| AU | 352300 | 11/2013 |
| CA | 2729154 | 1/2010 |

(Continued)

OTHER PUBLICATIONS

International Search Report and Written Opinion for PCT/US2013/040530 issued by ISA/US, Jan. 14, 2014.

(Continued)

*Primary Examiner* — James Yang
(74) *Attorney, Agent, or Firm* — Haynes and Boone, LLP

(57) ABSTRACT

According to one aspect, a digital display unit includes a microcontroller to process digital information received from one or more sensors, a display, and a switch in electrical communication with the microcontroller so that the microcontroller displays an output on the display that is specific to a type of sensor. The type of sensor may be selected from a position sensor, a pressure sensor, and a stroke counter. The digital display unit may be part of a choke control panel. The microcontroller and the display may be disposed in an enclosure, and an electrical power source may be disposed in the enclosure to supply electrical power to the microcontroller and the one or more sensors. A digital hydraulic choke position sensor assembly and a digital pressure sensor assembly are also described, one or both of which may be used in a system for drilling an oil or gas well.

14 Claims, 23 Drawing Sheets

(56) References Cited

U.S. PATENT DOCUMENTS

| | | |
|---|---|---|
| 4,297,659 A | 10/1981 | Augst |
| 4,373,354 A | 2/1983 | Sawyer |
| 4,397,659 A | 8/1983 | Gowan et al. |
| 4,404,425 A | 9/1983 | Rich |
| 4,474,254 A | 10/1984 | Etter et al. |
| D280,406 S | 9/1985 | Walker |
| 4,635,735 A | 1/1987 | Crownover |
| D288,417 S | 2/1987 | Morrison |
| 4,666,471 A | 5/1987 | Cates |
| 4,697,294 A | 10/1987 | Schaefer |
| 4,737,287 A | 4/1988 | Prendergast |
| 4,762,438 A | 8/1988 | Dewing |
| 5,028,318 A | 7/1991 | Aslin |
| 5,095,822 A | 3/1992 | Martin |
| D334,542 S | 4/1993 | Lowe et al. |
| 5,209,765 A | 5/1993 | Kolpak et al. |
| D336,524 S | 6/1993 | White et al. |
| 5,267,367 A | 12/1993 | Wegmann, Jr. |
| D348,230 S | 6/1994 | Shairba |
| 5,526,684 A | 6/1996 | Liu et al. |
| 5,599,365 A | 2/1997 | Alday et al. |
| D387,181 S | 12/1997 | Sinclair |
| 5,755,527 A | 5/1998 | Dufresne |
| 5,777,266 A | 7/1998 | Herman et al. |
| 5,780,773 A | 7/1998 | Wakamatsu |
| 5,859,430 A | 1/1999 | Mullins et al. |
| 5,919,036 A | 7/1999 | O'Brien et al. |
| 5,928,519 A | 7/1999 | Homan |
| D412,490 S | 8/1999 | Henry |
| D415,112 S | 10/1999 | Henry |
| D415,471 S | 10/1999 | Henry |
| 5,997,284 A | 12/1999 | Gustafson et al. |
| D423,293 S | 4/2000 | Pischke |
| D425,627 S | 5/2000 | Harwood et al. |
| 6,067,681 A | 5/2000 | Zeinstra et al. |
| D429,695 S | 8/2000 | Henry |
| D430,543 S | 9/2000 | Rohder |
| D431,488 S | 10/2000 | Jonasz |
| 6,164,308 A | 12/2000 | Butler |
| D436,578 S | 1/2001 | Henry |
| D437,832 S | 2/2001 | Henry |
| D438,802 S | 3/2001 | Krunas |
| 6,202,565 B1 | 3/2001 | Henry |
| 6,287,047 B1 | 9/2001 | Dufresne |
| 6,431,855 B1 | 8/2002 | Pedersen |
| 6,481,036 B1 | 11/2002 | Duvall |
| 6,499,410 B1 | 12/2002 | Berardi |
| 6,564,619 B2 | 5/2003 | Dutton et al. |
| 6,658,757 B2 | 12/2003 | Fout et al. |
| 6,747,212 B1 | 6/2004 | Henry |
| 6,793,814 B2 | 9/2004 | Fout et al. |
| 6,878,881 B1 | 4/2005 | Henry |
| 6,881,349 B2 | 4/2005 | Mueller |
| D512,134 S | 11/2005 | Lipscomb et al. |
| 6,977,048 B2 | 12/2005 | Mueller et al. |
| 6,989,103 B2 | 1/2006 | Mohsen et al. |
| D521,230 S | 5/2006 | Linz et al. |
| D525,550 S | 7/2006 | Egidio |
| D533,474 S | 12/2006 | Megale et al. |
| 7,145,079 B1 | 12/2006 | Henry |
| 7,152,682 B2 | 12/2006 | Hopper et al. |
| 7,207,399 B2 | 4/2007 | Duhe et al. |
| 7,309,836 B2 | 12/2007 | Lubanski |
| 7,332,097 B2 | 2/2008 | Fout et al. |
| D563,323 S | 3/2008 | Henry |
| 7,377,336 B2 | 5/2008 | Duhe et al. |
| D570,332 S | 6/2008 | Landerholm et al. |
| 7,385,139 B2 | 6/2008 | Lubanski |
| 7,394,025 B1 | 7/2008 | Wong |
| 7,429,327 B2 | 9/2008 | Fout et al. |
| 7,438,142 B2 | 10/2008 | Butler et al. |
| D583,771 S | 12/2008 | Lubanski |
| 7,458,257 B2 | 12/2008 | Pop et al. |
| 7,497,954 B2 | 3/2009 | Ivan et al. |
| 7,503,950 B2 | 3/2009 | Haland et al. |
| 7,507,280 B2 | 3/2009 | Tomshak et al. |
| 7,569,098 B2 | 8/2009 | Oglesby et al. |
| 7,591,605 B2 | 9/2009 | Jonasz et al. |
| 7,592,547 B2 | 9/2009 | Lubanski |
| 7,595,450 B2 | 9/2009 | Lubanski |
| D609,789 S | 2/2010 | Milnes |
| D611,811 S | 3/2010 | Gilbert |
| 7,674,980 B2 | 3/2010 | Lubanski |
| 7,691,259 B2 | 4/2010 | Freeman et al. |
| 7,727,316 B2 | 6/2010 | Mueller et al. |
| 7,744,067 B2 | 6/2010 | Kurukchi et al. |
| 7,795,535 B2 | 9/2010 | Lubanski |
| D625,395 S | 10/2010 | Guzzoni |
| 7,810,197 B1 | 10/2010 | Anthony |
| D627,038 S | 11/2010 | Yu |
| 7,838,772 B2 | 11/2010 | Lubanski |
| 7,862,730 B2 | 1/2011 | McEwen et al. |
| 7,943,851 B2 | 5/2011 | Lubanski |
| 7,947,628 B2 | 5/2011 | Oakley et al. |
| 8,001,643 B1 | 8/2011 | James |
| 8,025,713 B2 | 9/2011 | Dou et al. |
| D647,247 S | 10/2011 | Jones |
| 8,066,870 B2 | 11/2011 | Freeman et al. |
| D650,053 S | 12/2011 | Douglass, III |
| D651,107 S | 12/2011 | Bradford et al. |
| 8,083,935 B2 | 12/2011 | Eia |
| D653,139 S | 1/2012 | Lee |
| 8,087,293 B2 | 1/2012 | Dou et al. |
| 8,119,914 B2 | 2/2012 | Lubanski |
| 8,142,634 B2 | 3/2012 | McCosh |
| D657,277 S | 4/2012 | Dallwig et al. |
| D665,513 S | 8/2012 | Engel |
| D680,891 S | 4/2013 | Dallwig et al. |
| 8,506,821 B2 | 8/2013 | Pruett et al. |
| D690,217 S | 9/2013 | Sands et al. |
| 8,536,524 B2 | 9/2013 | Pomerantz et al. |
| 8,784,545 B2 | 7/2014 | Mathena |
| D730,317 S | 5/2015 | Silvera |
| 2003/0051881 A1 | 3/2003 | Vinegar et al. |
| 2004/0153281 A1 | 8/2004 | Jaynes |
| 2005/0092523 A1* | 5/2005 | McCaskill ............... E21B 21/08 175/38 |
| 2005/0166759 A1 | 8/2005 | Ross et al. |
| 2006/0201671 A1* | 9/2006 | Rogers ................. E21B 21/106 166/250.12 |
| 2007/0151907 A1 | 7/2007 | Duhe et al. |
| 2007/0175331 A1 | 8/2007 | Tomshak et al. |
| 2008/0078699 A1 | 4/2008 | Carr |
| 2008/0179095 A1 | 7/2008 | Eia |
| 2008/0185813 A1 | 8/2008 | Watson |
| 2008/0190668 A1 | 8/2008 | Swartout |
| 2009/0255560 A1 | 10/2009 | Lehmann et al. |
| 2010/0064893 A1 | 3/2010 | Hopper |
| 2010/0233950 A1* | 9/2010 | Benkert ................. B64D 13/04 454/72 |
| 2010/0242813 A1 | 9/2010 | Takashima et al. |
| 2010/0249540 A1* | 9/2010 | Lisogurski ........... A61B 5/0002 600/301 |
| 2011/0105292 A1 | 5/2011 | Walraven et al. |
| 2011/0114389 A1 | 5/2011 | Mathena |
| 2011/0139851 A1 | 6/2011 | McCuen |
| 2011/0186525 A1 | 8/2011 | Dixit |
| 2011/0259581 A1 | 10/2011 | Bedouet et al. |
| 2011/0284288 A1 | 11/2011 | Sawyer et al. |
| 2011/0285647 A1* | 11/2011 | Imamura ............... G06F 1/1616 345/173 |
| 2012/0024531 A1 | 2/2012 | Suter |
| 2012/0096895 A1 | 4/2012 | Patel et al. |
| 2012/0179149 A1 | 7/2012 | Delonzor |
| 2012/0238793 A1 | 9/2012 | Cullinane et al. |
| 2012/0245014 A1 | 9/2012 | Jones et al. |
| 2012/0298559 A1 | 11/2012 | Newman et al. |
| 2013/0031878 A1 | 2/2013 | Menssen |
| 2013/0047351 A1 | 2/2013 | Breault |
| 2013/0081368 A1 | 4/2013 | Mueller |
| 2013/0174524 A1 | 7/2013 | Inge et al. |
| 2013/0270467 A1 | 10/2013 | Johnson et al. |
| 2014/0034447 A1 | 2/2014 | Mathena |

(56) References Cited

U.S. PATENT DOCUMENTS

| | | | |
|---|---|---|---|
| 2014/0131030 A1 | 5/2014 | Mathena | |
| 2014/0299443 A1 | 10/2014 | Mathena | |
| 2015/0099231 A1 | 4/2015 | Long et al. | |

FOREIGN PATENT DOCUMENTS

| | | | |
|---|---|---|---|
| CH | 697992 B1 | 4/2009 | |
| CN | 1669664 A | 9/2005 | |
| CN | 2886155 Y | 4/2007 | |
| CN | 201046371 Y | 4/2008 | |
| CN | 201575838 U | 9/2010 | |
| CN | 202270591 U | 6/2012 | |
| CN | 102688631 A | 9/2012 | |
| CN | 103596697 A | 2/2014 | |
| EP | 0050312 A2 | 4/1982 | |
| EP | 0185827 A1 | 7/1986 | |
| FR | 2641362 A1 | 7/1990 | |
| GB | 163186 A | 5/1921 | |
| GB | 2177951 A | 2/1987 | |
| GB | 2240801 A | 8/1991 | |
| GB | 2272425 A | 5/1994 | |
| GB | 2441069 B | 7/2008 | |
| GB | 4012312 | 9/2009 | |
| GB | 4014581 | 1/2011 | |
| JP | 07049294 | 2/1995 | |
| JP | 11138053 | 5/1999 | |
| JP | 2001070469 A | 3/2001 | |
| JP | 3588891 B2 | 11/2004 | |
| JP | D1258935 S | 11/2005 | |
| RU | 2372146 C1 | 11/2009 | |
| SG | 194148 | 10/2014 | |
| WO | WO-2005094962 A1 | 10/2005 | |
| WO | 2008068828 A1 | 6/2008 | |
| WO | WO-2008117005 A1 | 10/2008 | |
| WO | 2009097869 A1 | 8/2009 | |
| WO | 2010002360 A1 | 1/2010 | |
| WO | WO-2012092386 A2 | 7/2012 | |
| WO | 2012141691 A1 | 10/2012 | |
| WO | WO-2013106843 A1 | 7/2013 | |
| WO | WO-2013170137 | 11/2013 | |
| WO | WO-2015051246 | 4/2015 | |

OTHER PUBLICATIONS

International Preliminary Report on Patentability for PCT/US2013/040530 issued by IB of WIPO, Nov. 20, 2014.
Co-pending U.S. Appl. No. 29/448,068, filed Mar. 8, 2013.
Co-pending U.S. Appl. No. 29/453,843, filed May 3, 2013.
Co-pending U.S. Appl. No. 29/453,882, filed May 3, 2013.
"International Preliminary Report on Patentability by the IPEA/US, mailed May 13, 2011, regarding PCT/US2008/008143".
"International Search Report and Written Opinion, by the ISA/US, mailed Jul. 5, 2011, regarding PCT/US2011/032122".
"International Search Report and Written Opinion by the ISA/US, mailed Oct. 9, 2008, regarding PCT/US2008/008143."
"Office Action mailed Feb. 7, 2013, by the USPTO, regarding U.S. Appl. No. 13/000,964".
"Office Action mailed Jun. 14, 2013, by the USPTO, regarding U.S. Appl. No. 13/000,964".
"WP Resources LLC; http://www.w-p-resources.com; 15 pages; Jul. 30, 2013".
Mathena, "Vent Line Drive-Over" (brochure), 2 pages; 2012.
Official Action for MX/a/2011/000055 by Mexican Patent Office (English translation), 2013.
"Advisory Action mailed Oct. 22, 2013, by the USPTO, re U.S. Appl. No. 13/000,964".
"Beaver Valley Supply Company: Westfield Portable Drive over Pit, Announced May 27, 2011, www.beavervalleysupply.com/sectiona/westpit.htm".
"Canadian Exam Report dated Jul. 31, 2014, by the CIPO, re App No. 2729154".
"Canadian Exam Report dated May 27, 2015, by the CIPO, re App No. 2729154".
"Canadian Examiner's Report mailed Mar. 24, 2014, by the CIPO, re App No. 152825".
"Chinese Office Action, dated Jun. 3, 2015, re App No. 201180071580.8".
"Chinese Office Action dated Oct. 10, 2014, re App No. 201180071580.8".
"Final Office Action mailed Sep. 6, 2013, by the USPTO, re U.S. Appl. No. 13/000,964".
"International Preliminary Report on Patentability by the IPEA/US, dated May 7, 2013, re PCT/US2011/032122".
"International Search Report and Written Opinion mailed Jan. 14, 2014, by the ISA/US, re PCT/US2013/040530".
"International Search Report and Written Opinion mailed Jan. 7, 2015, by the ISA/US, re PCT/US2014/059037".
"Mexican Examination Report (2) regarding MX/a/2011/000055, 2014".
"Mexican Examination Report (3) regarding MX/a/2011/000055, 2015".
"M-I Swaco; Mud/Gas Separator brochure; 1998".
"M-I Swaco; Super Mud/Gas Separator brochure; 1998".
"M-I Swaco; Toga System brochure; 1999".
"Notice of Allowance mailed Aug. 12, 2014, by the USPTO, re U.S. Appl. No. 29/448,068".
"Notice of Allowance mailed May 1, 2014, by the USPTO, re U.S. Appl. No. 14/049,726".
"Notice of Allowance mailed May 23, 2014, by the USPTO, re U.S. Appl. No. 29/453,843".
"Notice of Allowance mailed May 23, 2014, by the USPTO, re U.S. Appl. No. 29/453,882".
"Notice of Allowance mailed Nov. 7, 2013, by the USPTO, re U.S. Appl. No. 13/000,964".
"Office Action mailed Aug. 14, 2015, by the USPTO, re U.S. Appl. No. 29/476,070".
"Office Action mailed Aug. 3, 2015, by the USPTO, re U.S. Appl. No. 14/310,410".
"Office Action mailed Jan. 27, 2014, by the USPTO, re U.S. Appl. No. 14/049,726".
"Office Action/Restriction mailed Apr. 30, 2015, by the USPTO, re U.S. Appl. No. 14/310,410".
"Office Action/Restriction mailed Aug. 19, 2015, by the USPTO, re U.S. Appl. No. 14/158,367".
"T & S Sales; TFX2 100 Grain Auger, Announced Dec. 24, 2005, http://nwgrainaugers.com/grain-augers/tfx2-series-auger/".

* cited by examiner

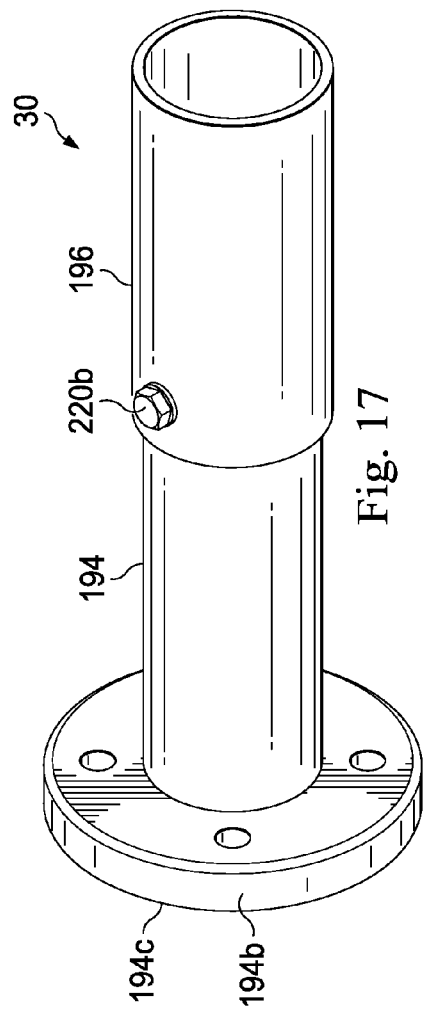
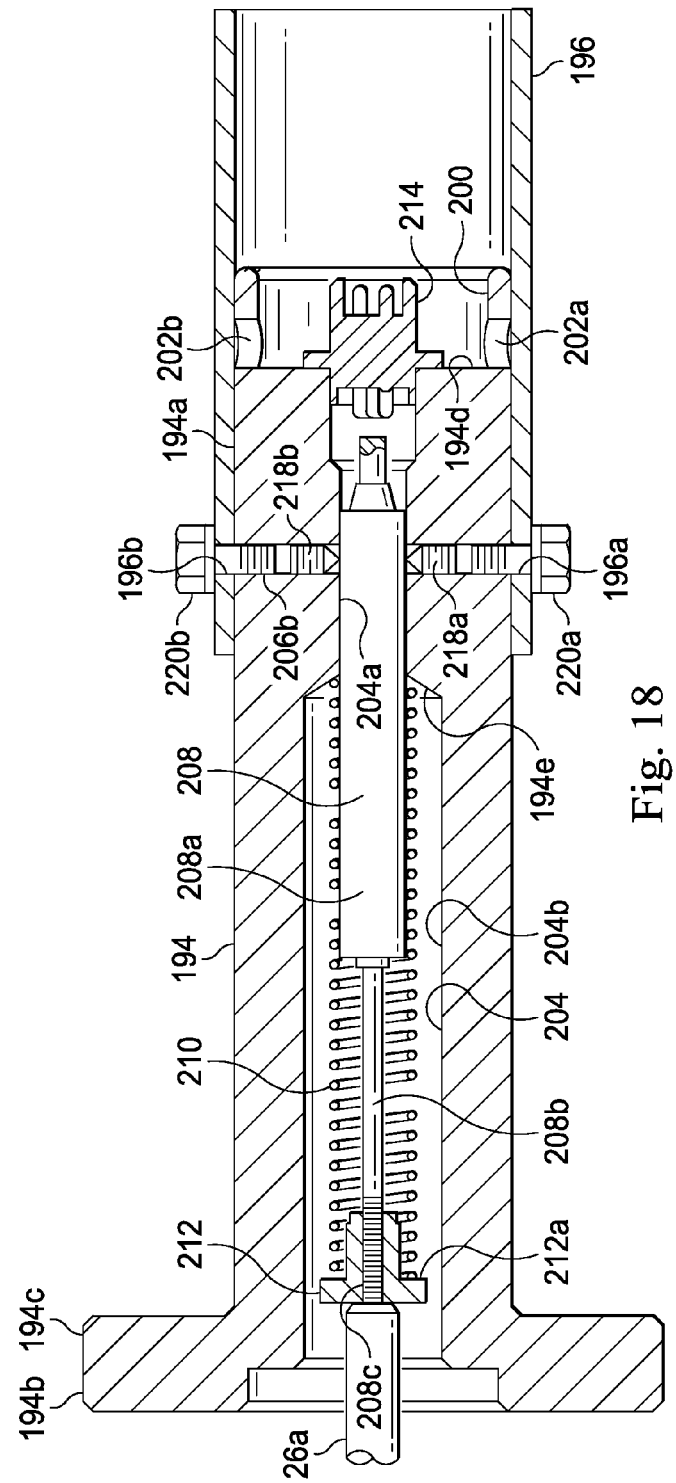

CONTROL PANEL, AND DIGITAL DISPLAY UNITS AND SENSORS THEREFOR

CROSS-REFERENCE TO RELATED APPLICATIONS

This application claims the benefit of the filing date of U.S. patent application No. 61/646,056, filed May 11, 2012, the entire disclosure of which is incorporated herein by reference.

This application claims the benefit of the filing date of U.S. patent application No. 61/819,329, filed May 3, 2013, the entire disclosure of which is incorporated herein by reference.

TECHNICAL FIELD

This disclosure relates in general to control panels and, in particular, a choke control panel for a choke system used in, for example, a system for drilling an oil or gas well.

BACKGROUND OF THE DISCLOSURE

During the drilling of an oil or gas well, backpressure control devices or "chokes" are used to impose backpressure on drilling fluid. Choke control panels may be used to monitor and/or control the imposition of backpressure by chokes. In some cases, choke control panels employ particularized and expensive gauges, which are not easily interchangeable. Additionally, some choke control panels or sensors and gauges thereof are dependent upon an external power source, such as a power source on a drilling rig. Still other choke control panels or gauges thereof do not provide sufficient incremental resolution of the values of different operation parameters, and/or are not operationally compatible with different types of chokes, such as both hydraulic and electric chokes. Therefore, what is needed is an apparatus, system or method that addresses one or more of the foregoing issues, among others.

SUMMARY

In a first aspect, there is provided a system that includes a frame; a first digital display unit connected to the frame and capable of receiving digital information from each of a plurality of sensors, the first digital display unit including a first microcontroller to process digital information received from one or more sensors in the plurality of sensors; a first display in electrical communication with the first microcontroller; and a first switch in electrical communication with the first microcontroller so that, when the first microcontroller receives digital information from the one or more sensors in the plurality of sensors, the first microcontroller recognizes a first type of sensor from which the first microcontroller either is, or at least should be, receiving the digital information and displays a first output on the first display that is specific to the recognized first type of sensor; and a second digital display unit connected to the frame and capable of receiving digital information from each of the plurality of sensors, the second digital display unit including a second microcontroller to process digital information received from one or more other sensors in the plurality of sensors; a second display in electrical communication with the second microcontroller; and a second switch in electrical communication with the second microcontroller so that, when the second microcontroller receives the digital information from the one or more other sensors in the plurality of sensors, the second microcontroller recognizes a second type of sensor from which the second microcontroller either is, or at least should be, receiving the digital information; wherein the second type of sensor is different from the first type of sensor, the second switch is different from the first switch, and the second microcontroller displays a second output on the second display that is specific to the recognized second type of sensor and thus different from the first output.

In an exemplary embodiment, each of the first and second types of sensors is selected from the group consisting of a position sensor, a pressure sensor, and a stroke counter.

In another exemplary embodiment, the first type of sensor is a digital hydraulic choke position sensor, the second type of sensor is one of a digital pressure sensor and a digital stroke counter, and the frame and the first and second digital display units are part of a choke control panel.

In certain exemplary embodiments, the first output includes a value corresponding to the degree to which a hydraulic choke is open or closed; and wherein the second output includes one of a pressure value and a stroke rate.

In an exemplary embodiment, the system includes a digital hydraulic choke position sensor assembly adapted to determine the choke position of the hydraulic choke, the hydraulic choke including a rod, the digital hydraulic choke position sensor assembly being of the first type of sensor and including a housing adapted to be connected to the hydraulic choke, the housing defining a longitudinally-extending passage; and a digital position sensor disposed in the longitudinally-extending passage to sense movement of the rod and output digital information corresponding to the sensed movement; wherein the digital position sensor is adapted to be in electrical communication with the first microcontroller.

In another exemplary embodiment, the second type of sensor is the digital pressure sensor; and wherein the system further includes a digital pressure sensor assembly being of the second type of sensor, the digital pressure sensor assembly including a cover including first and second opposing end portions; a longitudinally-extending passage formed in the first end portion; a connector located at the second end portion and in electrical communication with the second microcontroller; and a pressure transducer adapted to be in electrical communication with the connector; and a plurality of components via which the pressure transducer is in electrical communication with the connector, wherein the components extend within the longitudinally-extending passage.

In certain exemplary embodiments, the first digital display unit includes a first enclosure and a first lid assembly connected thereto, the first lid assembly including the first microcontroller, the first display, and the first switch; and wherein the second digital display unit includes a second enclosure and a second lid assembly connected thereto, the second lid assembly including the second microcontroller, the second display, and the second switch.

In an exemplary embodiment, the second microcontroller is identical to the first microcontroller; wherein the second enclosure is identical to the first enclosure; wherein the second display is identical to the first display; and wherein the second switch is different from the first switch.

In another exemplary embodiment, the first and second lid assemblies are interchangeable between the first and second enclosures so that, when the first and second lid assemblies are interchanged: the first digital display unit includes the first enclosure and the second lid assembly connected thereto, and the second digital display unit includes the second enclosure and the first lid assembly connected thereto.

In certain exemplary embodiments, the first digital display unit includes a first electrical power source in electrical communication with the first microcontroller to supply electrical power thereto; wherein the second digital display unit includes a second electrical power source in electrical communication with the second microcontroller to supply electrical power thereto; and wherein the second electrical power source is independent of the first electrical power source.

In an exemplary embodiment, the system includes the plurality of sensors; wherein first electrical power source is in electrical communication with the one or more sensors to supply electric power thereto; and wherein the second electrical power source is in electrical communication with the one or more other sensors to supply electrical power thereto.

In a second aspect, there is provided an apparatus capable of receiving digital information from each of a plurality of sensors, the apparatus including a first microcontroller to process digital information received from one or more sensors in the plurality of sensors; a first display in electrical communication with the first microcontroller; and a first switch in electrical communication with the first microcontroller so that, when the first microcontroller receives the digital information from the one or more sensors in the plurality of sensors, the first microcontroller recognizes a first type of sensor from which the first microcontroller either is, or at least should be, receiving the digital information and displays a first output on the first display that is specific to the recognized first type of sensor.

In an exemplary embodiment, the apparatus includes a first enclosure in which each of the first microcontroller and the first display are disposed; and a first electrical power source disposed in the first enclosure to supply electrical power to the first microcontroller and each of the one or more sensors.

In another exemplary embodiment, the first type of sensor is selected from the group consisting of a position sensor, a pressure sensor, and a stroke counter.

In certain exemplary embodiments, the first type of sensor is a digital hydraulic choke position sensor; and wherein the first output includes a value corresponding to the degree to which a hydraulic choke is open or closed.

In an exemplary embodiment, the first type of sensor is one of a pressure sensor and a stroke counter; and wherein the first output includes one of a pressure value and a stroke rate.

In another exemplary embodiment, the apparatus includes a first enclosure and a first lid assembly connected thereto, the first lid assembly including the first microcontroller, the first display, and the first switch.

In certain exemplary embodiments, the apparatus includes a second lid assembly that is interchangeable with the first lid assembly so that, when the second lid assembly is interchanged with the first lid assembly, the second lid assembly is connected to the first enclosure instead of the first lid assembly being connected to the first enclosure; wherein the second lid assembly includes a second microcontroller to process digital information received from one or more other sensors in the plurality of sensors; a second display in electrical communication with the second microcontroller; and a second switch in electrical communication with the second microcontroller so that, when the second microcontroller receives the digital information from the one or more other sensors in the plurality of sensors, the second microcontroller recognizes a second type of sensor from which the second microcontroller either is, or at least should be, receiving the digital information and displays a second output on the second display that is specific to the recognized second type of sensor.

In a third aspect, there is provided an apparatus capable of receiving digital information from each of a plurality of sensors, the apparatus including a first enclosure; a first microcontroller disposed in the enclosure to process digital information received from one or more sensors in the plurality of sensors; a first display disposed in the enclosure and in electrical communication with the first microcontroller; and a first electrical power source disposed in the enclosure to supply electrical power to the first microcontroller and each of the one or more sensors.

In an exemplary embodiment, the apparatus includes a first switch in electrical communication with the first microcontroller so that, when the first microcontroller receives the digital information from the one or more sensors in the plurality of sensors, the first microcontroller recognizes a first type of sensor from which the first microcontroller either is, or at least should be, receiving the digital information and displays a first output on the first display that is specific to the recognized first type of sensor.

In another exemplary embodiment, the first type of sensor is selected from the group consisting of a position sensor, a pressure sensor, and a stroke counter.

In certain exemplary embodiments, the first type of sensor is a digital hydraulic choke position sensor; and wherein the first output includes a value corresponding to the degree to which a hydraulic choke is open or closed.

In an exemplary embodiment, the first type of sensor is one of a pressure sensor and a stroke counter; and wherein the first output includes one of a pressure value and a stroke rate.

In another exemplary embodiment, the apparatus includes a first lid assembly connected to the first enclosure, the first lid assembly including the first microcontroller, the first display, and the first switch.

In certain exemplary embodiments, the apparatus includes a second lid assembly that is interchangeable with the first lid assembly so that, when the second lid assembly is interchanged with the first lid assembly, the second lid assembly is connected to the first enclosure instead of the first lid assembly being connected to the first enclosure; wherein the second lid assembly includes a second microcontroller to process digital information received from one or more other sensors in the plurality of sensors; a second display in electrical communication with the second microcontroller; and a second switch in electrical communication with the second microcontroller so that, when the second microcontroller receives the digital information from the one or more other sensors in the plurality of sensors, the second microcontroller recognizes a second type of sensor from which the second microcontroller either is, or at least should be, receiving the digital information and displays a second output on the second display that is specific to the recognized second type of sensor.

In a fourth aspect, there is provided a kit including a plurality of enclosures; and a plurality of lid assemblies, each lid assembly in the plurality of lid assemblies being connectable to each enclosure in the plurality of enclosures; wherein each lid assembly includes a microcontroller capable of receiving and processing digital information from each sensor in a plurality of sensors; and a display in electrical communication with the microcontroller; wherein the respective microcontrollers of the lid assemblies are identical to one another; wherein each lid assembly includes a switch in electrical communication with the corresponding microcontroller of the lid assembly; and wherein each one of the switches is different from the other switches so that, when the lid assemblies are connected to the enclosures, respectively, and each of the microcontrollers receives digital information from one or more sensors in the plurality of sensors: at least one of the switches causes the corresponding microcontroller to recognize a first type of sensor from which the microcontroller either is, or at least should be, receiving the digital information and displays a first output on the corresponding display that is specific to the recognized first type of sensor; and at least one other of the switches causes the corresponding microcontroller to recognize a second type of sensor from which the microcontroller either is, or at least should be, receiving the digital information and displays a second output on the corresponding display that is specific to the recognized second type of sensor.

In an exemplary embodiment, the second type of sensor is different from the first type of sensor, the second switch is different from the first switch, and the second output is different from the first output.

In another exemplary embodiment, each of the first and second types of sensors is selected from the group consisting of a position sensor, a pressure sensor, and a stroke counter.

In certain exemplary embodiments, the first type of sensor is a digital hydraulic choke position sensor, the second type of sensor is one of a digital pressure sensor and a digital stroke counter, and the frame and the first and second digital display units are part of a choke control panel.

In an exemplary embodiment, the first output includes a value corresponding to the degree to which a hydraulic choke is open or closed; and wherein the second output includes one of a pressure value and a stroke rate.

In another exemplary embodiment, the kit includes a digital hydraulic choke position sensor assembly adapted to determine the choke position of the hydraulic choke, the hydraulic choke including a rod, the digital hydraulic choke position sensor assembly being of the first type of sensor and including: a housing adapted to be connected to the hydraulic choke, the housing defining a longitudinally-extending passage; and a digital position sensor disposed in the longitudinally-extending passage to sense movement of the rod and output digital information corresponding to the sensed movement; wherein the digital position sensor is adapted to be in electrical communication with one of the microcontrollers.

In certain exemplary embodiments, the second type of sensor is the digital pressure sensor; and wherein the kit further includes a digital pressure sensor assembly being of the second type of sensor, the digital pressure sensor assembly including a cover including first and second opposing end portions; a longitudinally-extending passage formed in the first end portion; a connector located at the second end portion and adapted to be in electrical communication with one of the microcontrollers; a pressure transducer in electrical communication with the connector; and a plurality of components via which the pressure transducer is in electrical communication with the connector, wherein the components extend within the longitudinally-extending passage.

In a fifth aspect, there is provided a digital hydraulic choke position sensor assembly adapted to determine the choke position of a hydraulic choke, the hydraulic choke including a first rod, the digital hydraulic choke position sensor assembly including a housing adapted to be connected to the hydraulic choke, the housing defining a longitudinally-extending passage; and a digital position sensor disposed in the longitudinally-extending passage to sense movement of the first rod and output digital information corresponding to the sensed movement.

In an exemplary embodiment, the digital hydraulic choke position sensor assembly includes an actuator button connected to the digital position sensor and adapted to engage the first rod of the hydraulic choke; and a connector assembly in electrical communication with the digital position sensor.

In another exemplary embodiment, the housing includes first and second opposing end portions; wherein the first end portion is adapted to be connected to the hydraulic choke; wherein the actuator button is located at the first end portion; and wherein the connector assembly is located at the second end portion.

In certain exemplary embodiments, the digital position sensor includes a tubular enclosure, a second rod extending in, and movable relative to, the tubular enclosure, and a cable assembly extending between the tubular enclosure and the connector assembly; and wherein the actuator button is connected to the distal end of the second rod.

In an exemplary embodiment, the longitudinally-extending passage includes a reduced-diameter portion in which the tubular enclosure and the cable assembly are disposed; and an enlarged-diameter portion in which at least a portion of the second rod is disposed.

In another exemplary embodiment, the actuator button includes an external shoulder; wherein the longitudinally-extending passage defines an internal surface of the housing; wherein the digital hydraulic choke position sensor assembly further includes a compression spring through which at least the second rod extends; and wherein the compression spring extends between the external shoulder of the actuator button and the internal surface of the housing so that the compression spring is compressed when the actuator button moves towards the internal surface.

In certain exemplary embodiments, the digital hydraulic choke position sensor assembly includes a plurality of fasteners to hold the digital position sensor in place within the longitudinally-extending passage.

In an exemplary embodiment, a region is formed in the second end portion and defines an axially-facing surface of the housing; wherein the reduced-diameter portion of the longitudinally-extending passage is adjacent the region; and wherein the connector assembly is connected to the axially-facing surface of the housing.

In a sixth aspect, there is provided a digital pressure sensor assembly that includes a cover including first and second opposing end portions; a longitudinally-extending passage formed in the first end portion; a connector located at the second end portion; a pressure transducer in electrical communication with the connector; and a plurality of components via which the pressure transducer is in electrical communication with the connector, wherein the components extend within the longitudinally-extending passage.

In an exemplary embodiment, the plurality of components includes a printed circuit board; a first cable assembly extending between the pressure transducer and the printed circuit board; and a second cable assembly extending between the printed circuit board and the connector.

In another exemplary embodiment, the digital pressure sensor assembly includes a base connected to the cover at the first end portion thereof; and a first bore formed through the base and in which the pressure transducer is disposed.

In certain exemplary embodiments, the digital pressure sensor assembly includes a region formed in the second end portion of the cover and defining an axially-facing surface of the cover; and a second bore formed through the axially-facing surface of the cover so that the region is in fluid communication with the longitudinally-extending passage; wherein the connector is connected to the axially-facing surface and at least a portion of the connector is disposed in the second bore.

In an exemplary embodiment, a first end portion of the base, which opposes the cover, is shaped in the form of a male hammer union nose; and wherein a nozzle is defined by the first bore at the first end portion.

In another exemplary embodiment, the digital pressure sensor assembly includes a nut connected to the base;

wherein the first bore defines an internal shoulder; and wherein the pressure transducer is captured between the nut and the internal shoulder.

In certain exemplary embodiments, the plurality of components includes a printed circuit board disposed in the longitudinally-extending passage; a first cable assembly extending between the pressure transducer and the printed circuit board, wherein the first cable assembly extends through the nut and within the longitudinally-extending passage; and a second cable assembly extending between the printed circuit board and the connector and within the longitudinally-extending passage.

In a seventh aspect, there is provided a method including at least one step according to one or more aspects of the present disclosure.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

FIG. 17 is a perspective view of one of the sensors of FIG. 2 according to an exemplary embodiment.

FIG. 18 is a sectional view of the sensor of FIG. 17 according to an exemplary embodiment.

DETAILED DESCRIPTION

Figure 1:
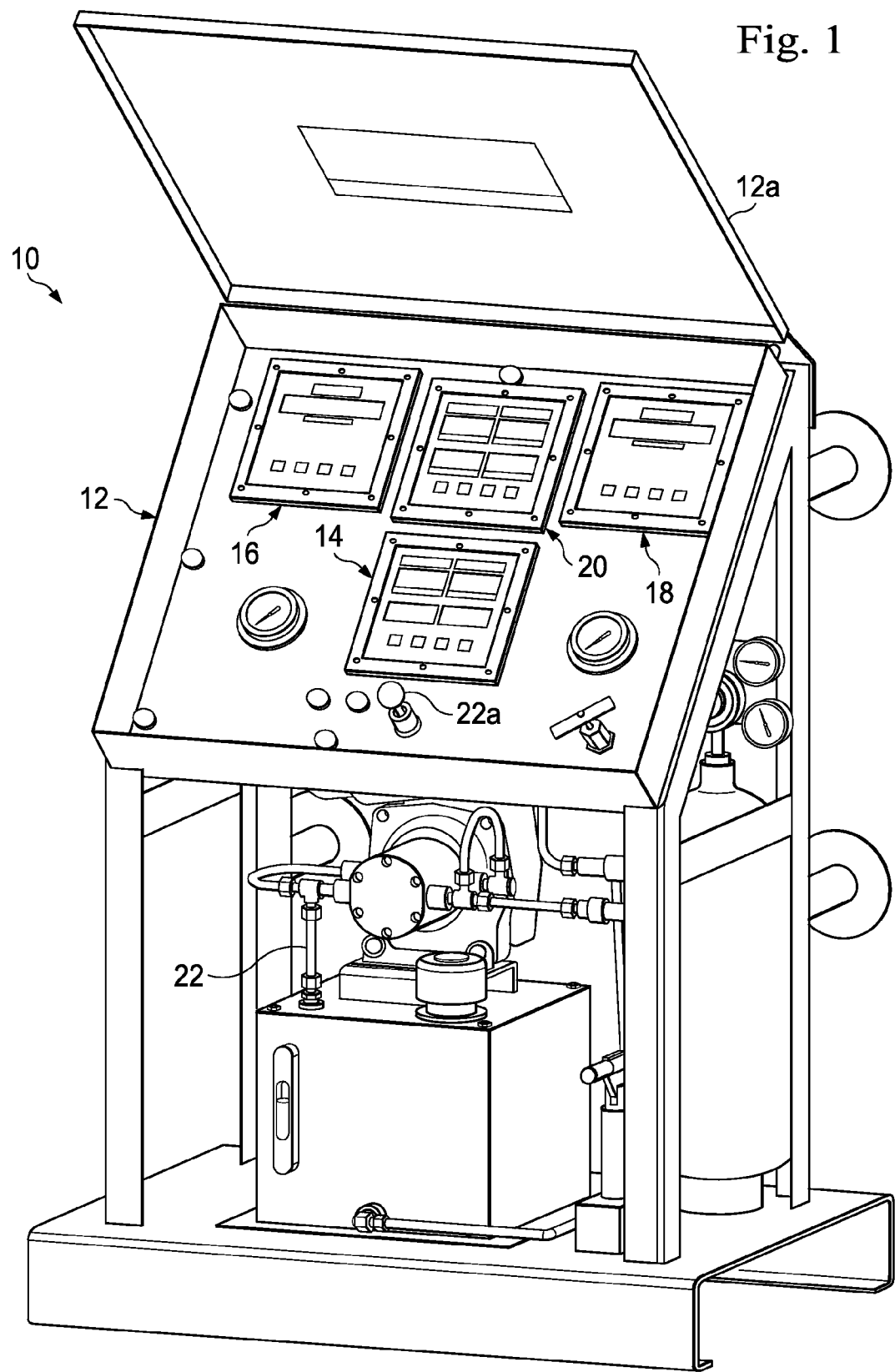
FIG. 1 is a perspective view of a choke control panel according to an exemplary embodiment, and the choke control panel includes a plurality of digital display units.

In an exemplary embodiment, as illustrated in FIG. 1, a control panel, or a choke control panel, for a hydraulic choke system is generally referred to by the reference numeral 10 and includes a frame 12 to which digital display units 14, 16, 18 and 20, and hydraulic control equipment 22, are connected. The frame 12 includes a pivotally-mounted cover 12a, which pivots between an open position (shown in FIG. 1) and a closed position in which the digital display units 14, 16, 18 and 20 are covered (not shown). The hydraulic control equipment 22 includes at least one control lever, such as a joystick 22a. In several exemplary embodiments, the hydraulic control equipment 22 includes one or more hydraulic pumps, one or more air-operated hydraulic pumps, one or more manually-operated hydraulic pumps, one or more hydraulic reservoir assemblies, one or more hydraulic hoses, and tubing. In several exemplary embodiments, the hydraulic control equipment 22 includes conventional hydraulic control equipment used to control one or more hydraulic chokes, which may be part of a system for drilling an oil or gas well. In several exemplary embodiments, the choke control panel 10 may be characterized as either a remote operating console or a choke control console.

Figure 2:
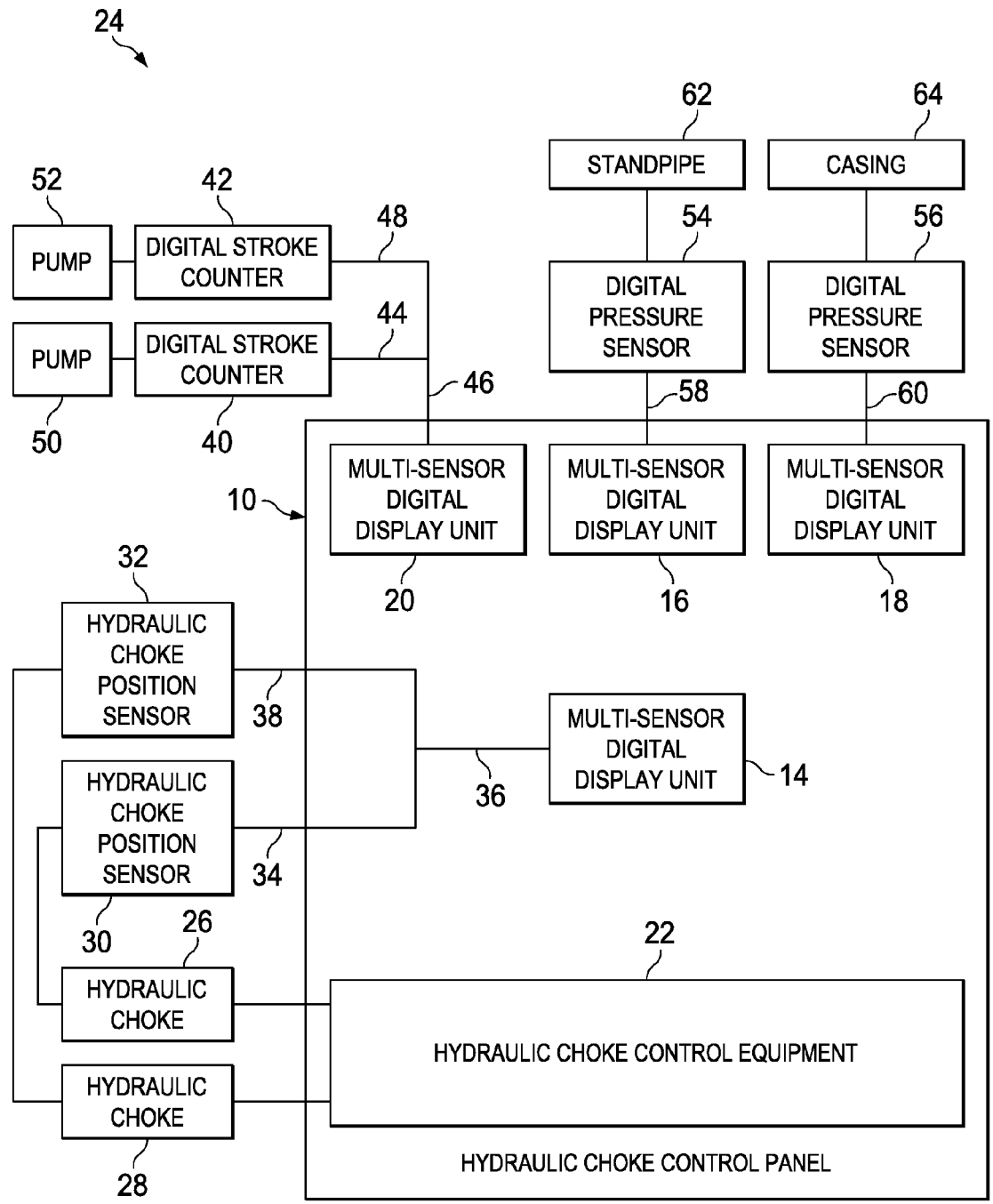
FIG. 2 is a diagrammatic illustration of a portion of a system for drilling an oil or gas well according to an exemplary embodiment, and the system includes the choke control panel of FIG. 1 and a plurality of sensors.

Referring to FIG. 2 with continuing reference to FIG. 1, illustrated is a diagrammatic view of a portion of a system 24 for drilling an oil or gas well. The system 24 includes the choke control panel 10. Hydraulic chokes 26 and 28 are operably coupled to the hydraulic control equipment 22. In several exemplary embodiments, each of the hydraulic chokes 26 and 28 is in fluid communication with one or more components of the hydraulic control equipment 22. Digital hydraulic choke position sensors 30 and 32 are operably coupled to the hydraulic chokes 26 and 28, respectively. Under conditions to be described below, the digital hydraulic choke positions sensors 30 and 32 are adapted to measure the degree to which the hydraulic chokes 26 and 28 are open or closed, respectively. In an exemplary embodiment, the digital hydraulic choke position sensor 30 is in electrical communication with the digital display unit 14 via cable assemblies 34 and 36, and the digital hydraulic choke position sensor 32 is in electrical communication with the digital display unit 14 via a cable assembly 38 and the cable assembly 36. In an exemplary embodiment, the cable assemblies 34 and 38 connect to the cable assembly 36 via a two-to-one connector or a Y connector, which connector may be mounted within, or outside of, the frame 12.

Digital stroke sensors or counters 40 and 42 are in electrical communication with the digital display unit 20. In an exemplary embodiment, the digital stroke counter 40 is in electrical communication with the digital display unit 20 unit via cable assemblies 44 and 46, and the digital stroke counter 42 is in electrical communication with the digital display unit 20 via a cable assembly 48 and the cable assembly 46. In an exemplary embodiment, the cable assemblies 44 and 48 connect to the cable assembly 46 via a two-to-one connector or a Y connector, which connector may be mounted outside of, or within, the frame 12. The digital stroke counters 40 and 42 are operably coupled to pumps 50 and 52, respectively. In an exemplary embodiment, each of the pumps 50 and 52 is a positive displacement drilling fluid (or mud) pump, which facilitates the circulation of drilling fluid or mud down through a drilling or casing string that extends within a wellbore, and up through an annular region defined between the wellbore and the drilling or casing string. Under conditions to be described below, the digital stroke counters 40 and 42 are adapted to provide an indication of fluid flow rate out of the pumps 50 and 52, respectively.

Digital pressure sensors 54 and 56 are in electrical communication with the digital display units 16 and 18, respectively. In an exemplary embodiment, the digital pressure sensors 54 and 56 are in electrical communication with the digital display units 16 and 18, respectively, via cable assemblies 58 and 60, respectively. The digital pressure sensor 54 is operably coupled to a standpipe 62, and the digital pressure sensor 56 is operably coupled to casing 64. Under conditions to be described below, the digital pressure sensors 54 and 56 are adapted to measure respective pressures at the standpipe 62 and the casing 64.

Each of the cable assemblies 34, 36, 38, 44, 46, 48, 58 and 60 may include one or more cable assemblies, one or more additional connectors, one or more connector mounting plates, or any combination thereof. One or more of the cable assemblies 34, 36, 38, 44, 46, 48, 58 and 60 may be combined in whole or in part with one or more of the other cable assemblies 34, 36, 38, 44, 46, 48, 58 and 60.

In several exemplary embodiments, although not shown in FIG. 2, the system 24 includes additional components or systems such as, for example, any type of drilling rig including, but not limited to, a land-based drilling rig, a jack-up rig, a semi-submersible rig, a drill ship, a coil tubing rig, a platform rig, a slant rig, or a casing drilling rig, among others.

Figure 3:
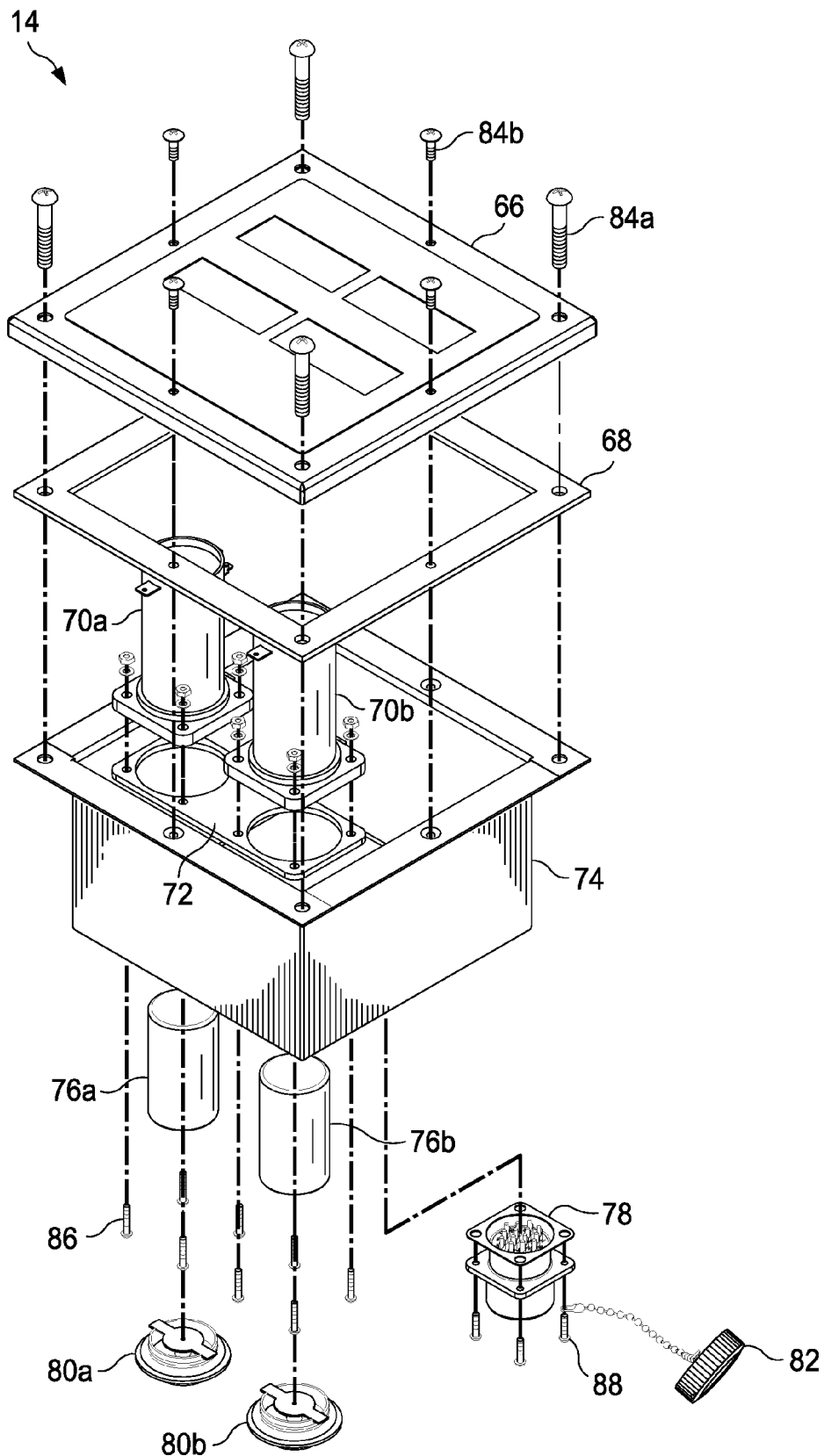
FIG. 3 is an exploded perspective view of a digital display unit of FIG. 1 according to an exemplary embodiment.

In an exemplary embodiment, as illustrated in FIG. 3 with continuing reference to FIGS. 1 and 2, the digital display unit 14 includes a lid assembly 66, a lid gasket 68, battery holders 70a and 70b, a battery holder gasket 72, a five-sided enclosure 74, batteries 76a and 76b, a connector assembly 78, battery lids 80a and 80b, and a cap assembly 82. When the digital display unit 14 is assembled, the lid assembly 66 is connected to a lip 74a of the enclosure 74 via pluralities of fasteners 84a and 84b. The lid gasket 68 is sandwiched between the lid assembly 66 and the lip 74a. The battery holders 70a and 70b are disposed within the enclosure 74 and connected to a bottom side 74a thereof via a plurality of fasteners 86. The battery holder gasket 72 is sandwiched between the bottom side 74a and the battery holders 70a and 70b. The batteries 76a and 76b are disposed within the battery holders 70a and 70b, respectively. The battery lids 80a and 80b are connected to the respective bottom portions of the battery holders 70a and 70b, respectively, thereby capturing the batteries 76a and 76b within the battery holders 70a and 70b, respectively. In an exemplary embodiment, the batteries 76a and 76b are disposed in the battery holders 70a and 70b, respectively, via respective cut-outs (not shown) formed through the bottom side 74a, and the battery lids 80a and 80b are connected to the battery holders 70a and 70b, respectively, via the respective cut-outs. The connector assembly 78 is connected to the bottom side 74a via a plurality of fasteners 88. The cap assembly 82 is connected to the connector 78, and may cover the bottom end of the connector assembly 78 when the connector assembly 78 is not connected to a cable assembly.

In an exemplary embodiment, each of the batteries 76a and 76b provides fast voltage recovery after long-term storage and/or usage, and high energy density. In an exemplary embodiment, each of the batteries 76a and 76b is a lithium battery. In an exemplary embodiment, each of the batteries 76a and 76b is a 3.6 V primary lithium-thionyl chloride (Li—SOCl2) battery. In an exemplary embodiment, each of the batteries 76a and 76b is, includes, or is part of, a Tadiran® TL-5930 lithium battery.

Figure 4:
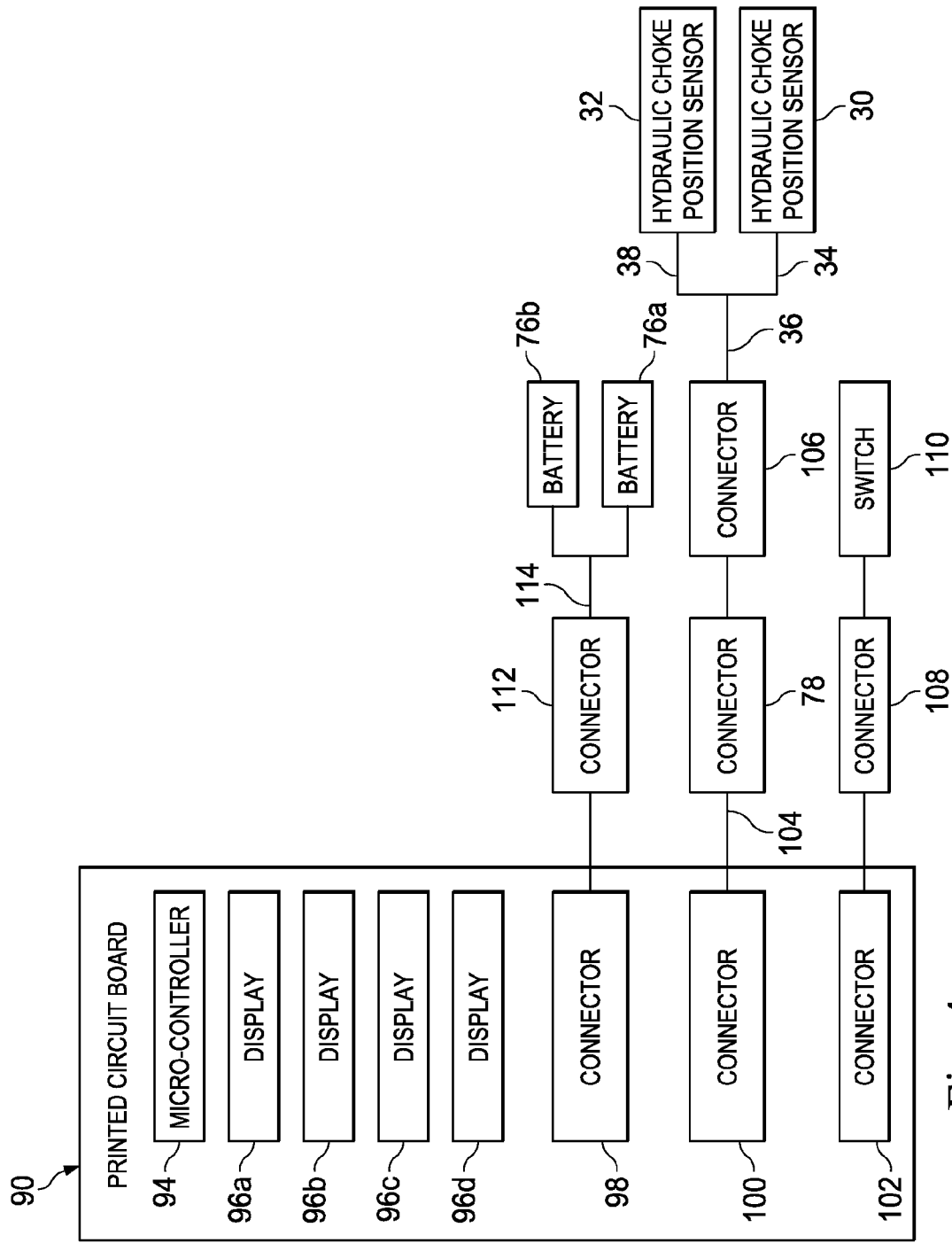
FIG. 4 is a diagrammatic illustration of a portion of the digital display unit of FIGS. 1 and 4 according to an exemplary embodiment, and the portion of the digital display unit is in electrical communication with two of the sensors of FIG. 2.
Figure 5:
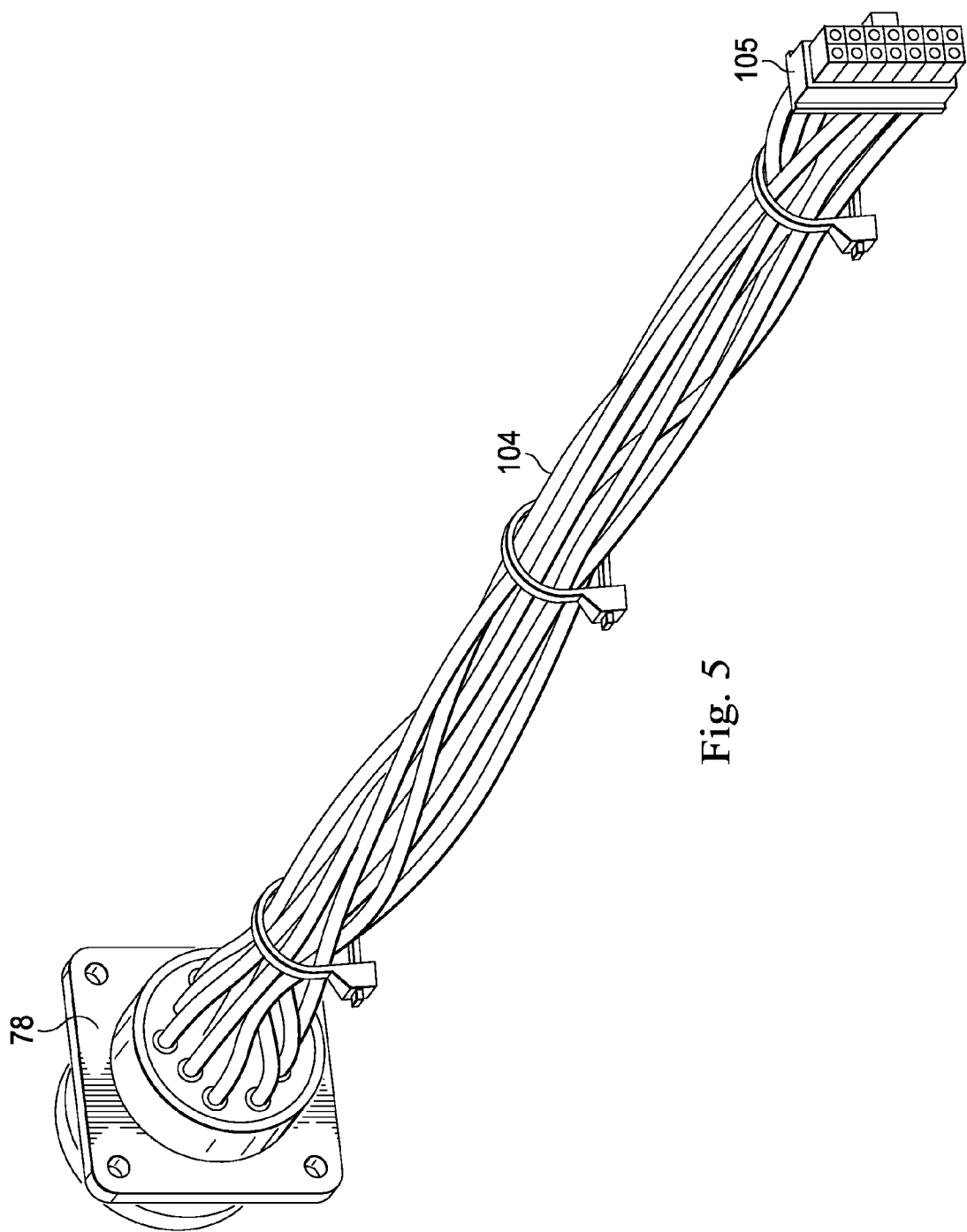
FIG. 5 is a perspective view of another portion of the digital display unit of FIGS. 1 and 4 according to an exemplary embodiment.

In an exemplary embodiment, as illustrated in FIGS. 4 and 5 with continuing reference to FIGS. 1-3, the lid assembly 66 includes a printed circuit board 90, with which microcontroller 94, digital displays 96a, 96b, 96c and 96d, and connectors 98, 100 and 102, are in electrical communication. The foregoing components may be in electrical communication with the microcontroller 94 via surface mount technology, through-hole technology, one or more additional cable assemblies, one or more additional connectors, one or more additional printed circuit boards, other components or systems, and/or any combination thereof. Via the printed circuit board 90, the microcontroller 94 is in electrical communication with each of the displays 96a, 96b, 96c and 96d, and the connectors 100 and 102. In an exemplary embodiment, the microcontroller 94 includes an MSP430™ microcontroller, which is available from Texas Instruments. In an exemplary embodiment, each of the displays 96a, 96b, 96c and 96d is a liquid crystal display. In an exemplary embodiment, each of the displays 96a, 96b, 96c and 96d is a seven-segment extended temperature range liquid crystal display. In an exemplary embodiment, each of the displays 96a, 96b, 96c and 96d is a seven-segment 0.7-inch extended temperature range liquid crystal display.

As shown in FIGS. 4 and 5, the connector assembly 78 is in electrical communication with the connector 100 via a cable assembly 104 and a connector 105. In an exemplary embodiment, the connector assembly 78 and the connector 105 may be characterized as part of the cable assembly 104. Although not shown in FIG. 3, the cable assembly 104 and the connector 105 are disposed within the enclosure 74, extending from the connector assembly 78 to the connector 100 on the printed circuit board 90. A connector 106 is connected to, and in electrical communication with, the connector assembly 78. In an exemplary embodiment, the connector 106 is coupled to a cable mounting plate (not shown), which is connected to the frame 12. In an exemplary embodiment, the connector 106, the connector assembly 78, and the cable assembly 104 are part of the cable assembly 36, which is shown in FIG. 2. Therefore, each of the digital hydraulic choke position sensors 30 and 32 is in electrical communication with the microcontroller 94 via the connector 106, the connector assembly 78, the cable assembly 104, the connector 100, and the printed circuit board 90.

As shown in FIG. 4, a connector 108 is connected to, and in electrical communication with, the connector 102. In an exemplary embodiment, the connector 102 is a flexible printed circuit (FPC) connector. In an exemplary embodiment, the connector 102 is a flexible printed circuit (FPC) surface mount technology (SMT) connector. A switch 110 is in electrical communication with the connector 108. The switch 110 is part of the lid assembly 66 and will be described in further detail below.

Figure 6:
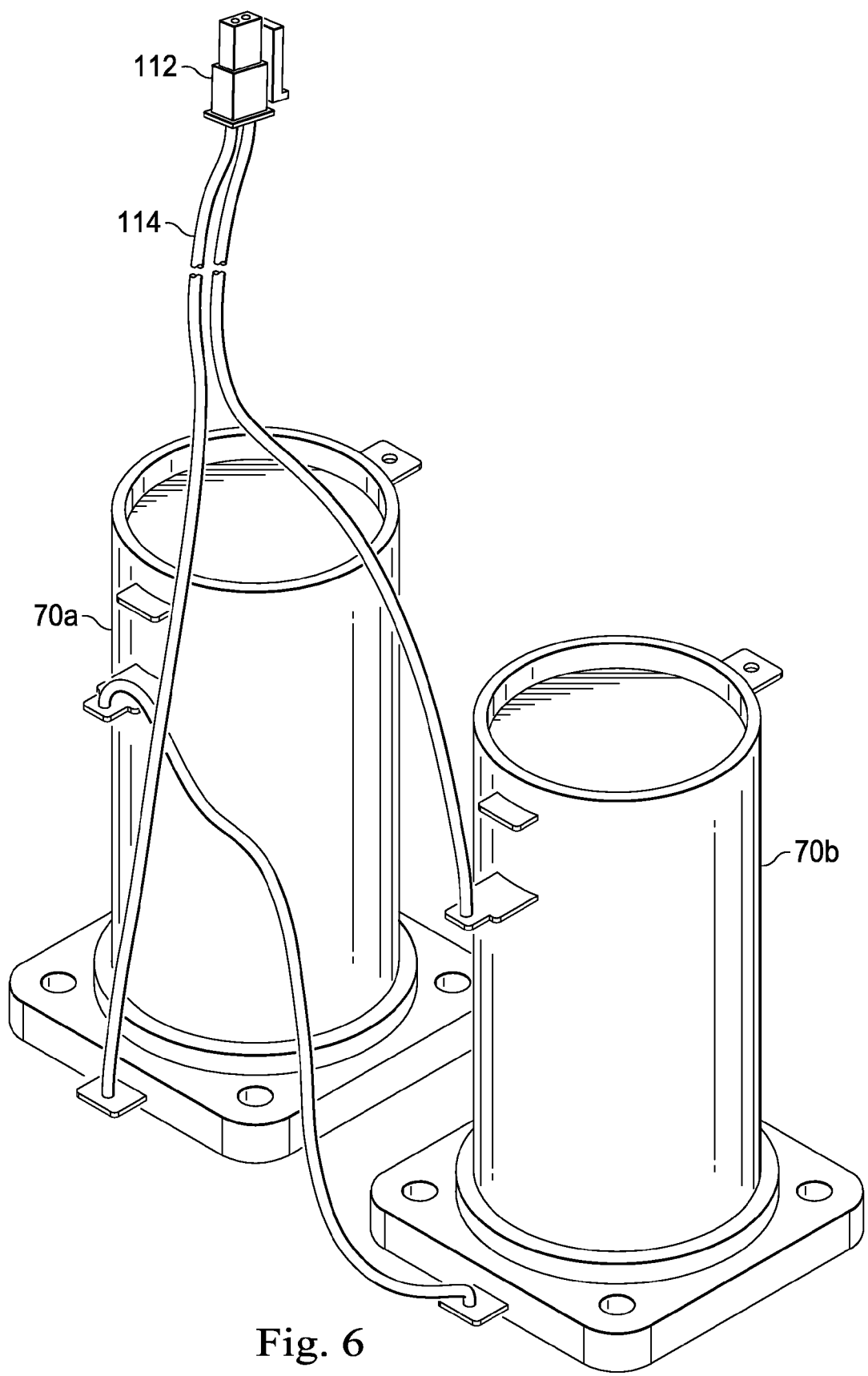
FIG. 6 is a perspective view of yet another portion of the digital display unit of FIGS. 1 and 4 according to an exemplary embodiment.

As shown in FIGS. 4 and 6, the batteries 76a and 76b are in electrical communication with a connector 112 via the respective battery holders 70a and 70b and a cable assembly 114. The connector 112 and the cable assembly 114 are disposed within the enclosure 74. In an exemplary embodiment, the connector 112 may be characterized as part of the cable assembly 114. As shown in FIG. 4, the connector 112 is connected to, and in electrical communication with, the connector 98. Under conditions to be described below, the batteries 76a and 76b are adapted to supply electrical power to the electrical components on the printed circuit board 90, including the microcontroller 94. The batteries 76a and 76b supply electrical power to such components via the respective holders 70a and 70b, the cable assembly 114, the connector 112, the connector 98, and the printed circuit board 90. Additionally, the batteries 76a and 76b are adapted to supply electrical power to the digital hydraulic choke position sensors 30 and 32. The batteries 76a and 76b supply electrical power to the digital hydraulic choke position sensors 30 and 32 via the respective holders 70a and 70b, the cable assembly 114, the connector 112, the connector 98, the printed circuit board 90, the connector 100, the cable assembly 104, the connector 78, the connector 106, the cable assembly 36, and the respective cable assemblies 34 and 38.

In several exemplary embodiments, any of the connectors and connector assemblies described herein that are connected to cable assemblies may be characterized as part of those cable assemblies. In several exemplary embodiments, any of the connectors described herein may be characterized as connector assemblies and vice versa. In several exemplary embodiments, any of the connectors, connector assemblies and cable assemblies described herein may be combined in whole or in part to form one or more cable assemblies, or may be characterized as one or more cable assemblies.

Figure 7:
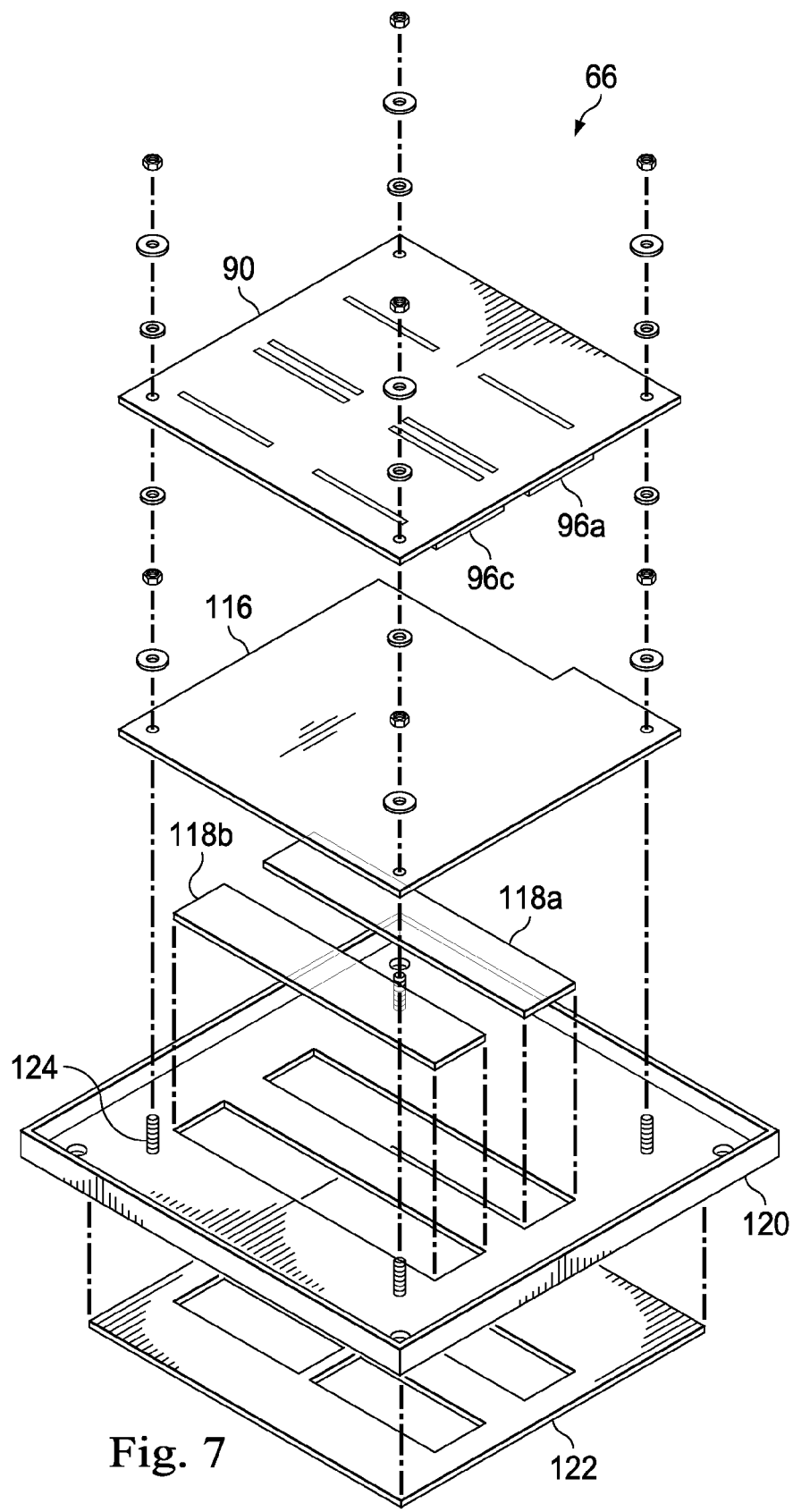
FIG. 7 is an exploded perspective view of still yet another portion of the digital display unit of FIGS. 1 and 4 according to an exemplary embodiment, and the portion includes an overlay assembly.

In an exemplary embodiment, as illustrated in FIG. 7 with continuing reference to FIGS. 1-6, the lid assembly 66 further includes transparent back plate 116, transparent inserts 118a and 118b, a lid 120, and an overlay assembly 122. When the lid assembly 66 is assembled, the printed circuit board 90, the back plate 116, the inserts 118a and 118b, and the lid 120 are connected together via a plurality of fasteners 124. The overlay assembly 122 is connected to the lid 120 via a mounting adhesive 124 (shown in FIG. 8). The back plate 116 is sandwiched between the printed circuit board 90 and the lid 120, and the inserts 118a and 118b are sandwiched between the back plate 116 and the lid 120. The insert 118a is aligned with the displays 96a and 96b, and the insert 118a is aligned with the displays 96c and 96d (the displays 96b and 96d are not shown in FIG. 7).

Figure 8:
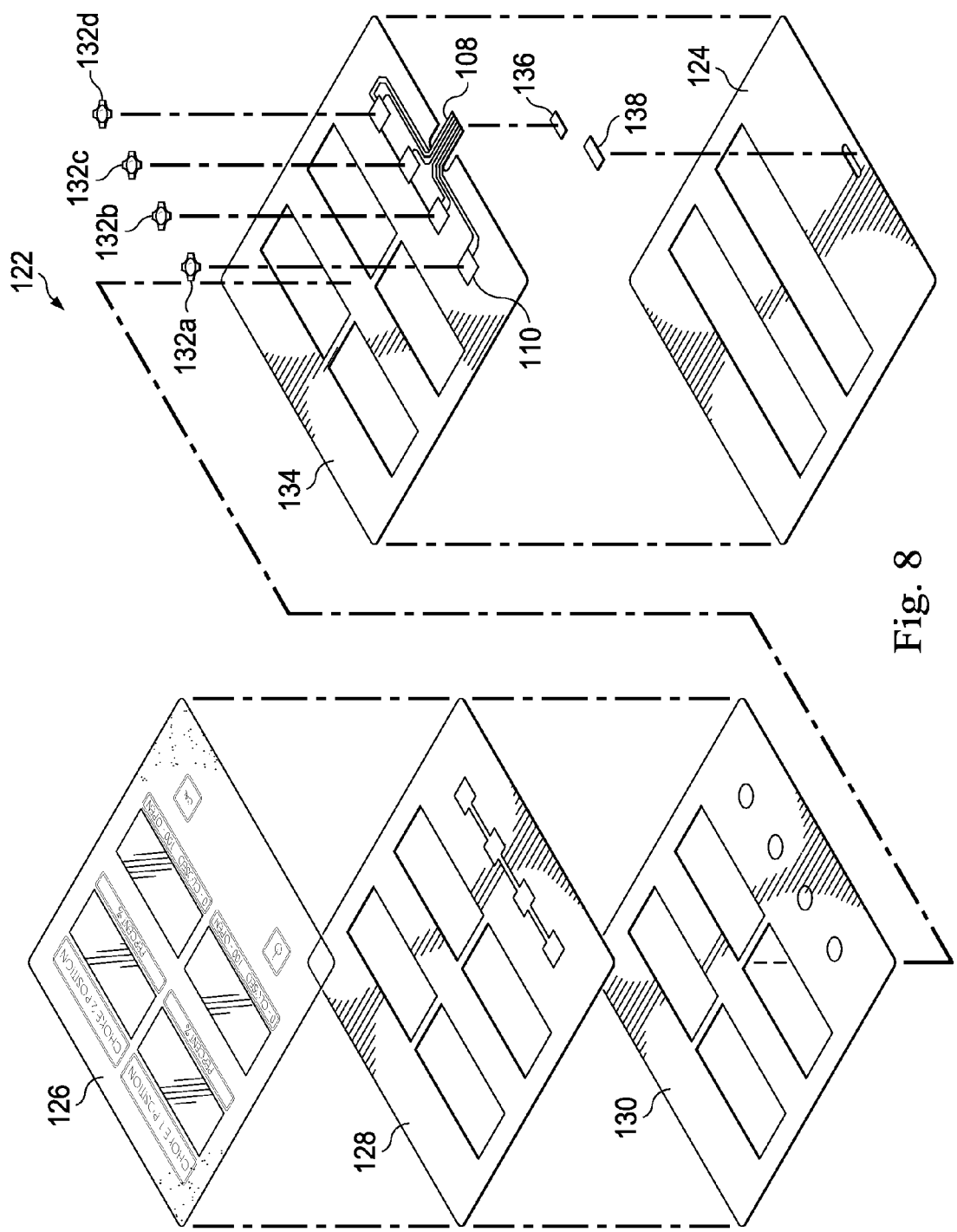
FIG. 8 is an exploded perspective view of the overlay assembly of FIG. 7 according to an exemplary embodiment, and the overlay assembly includes a switch.

In an exemplary embodiment, as illustrated in FIG. 8 with continuing reference to FIGS. 1-7, the overlay assembly 122 includes a graphic overlay 126, a dome spacer panel 128, a dome retainer panel 130, buttons or domes 132a, 132b, 132c and 132d, a panel 134 to which the switch 110 is connected, the connector 108, a connector stiffener 136, a connector filler 138, and the mounting adhesive 124. The dome spacer panel 128 is laminated with adhesive on both sides, and is sandwiched between the graphic overlay 126 and the dome retainer panel 130, thereby connecting the graphic overlay 126 to the dome retainer panel 130. The dome retainer panel 130 is backed with an adhesive, which connects the dome retainer panel 130 to the panel 134. The domes 132a, 132b, 132c and 132d are captured between the dome retainer panel 130 and the panel 134. The switch 110 is a circuit, and one or more of the domes 132a, 132b, 132c and 132d may form part of the circuit. The mounting adhesive 124 connects the overlay assembly 122 to the lid 120. A slot 124a is formed through the mounting adhesive 124.

Figure 9A:
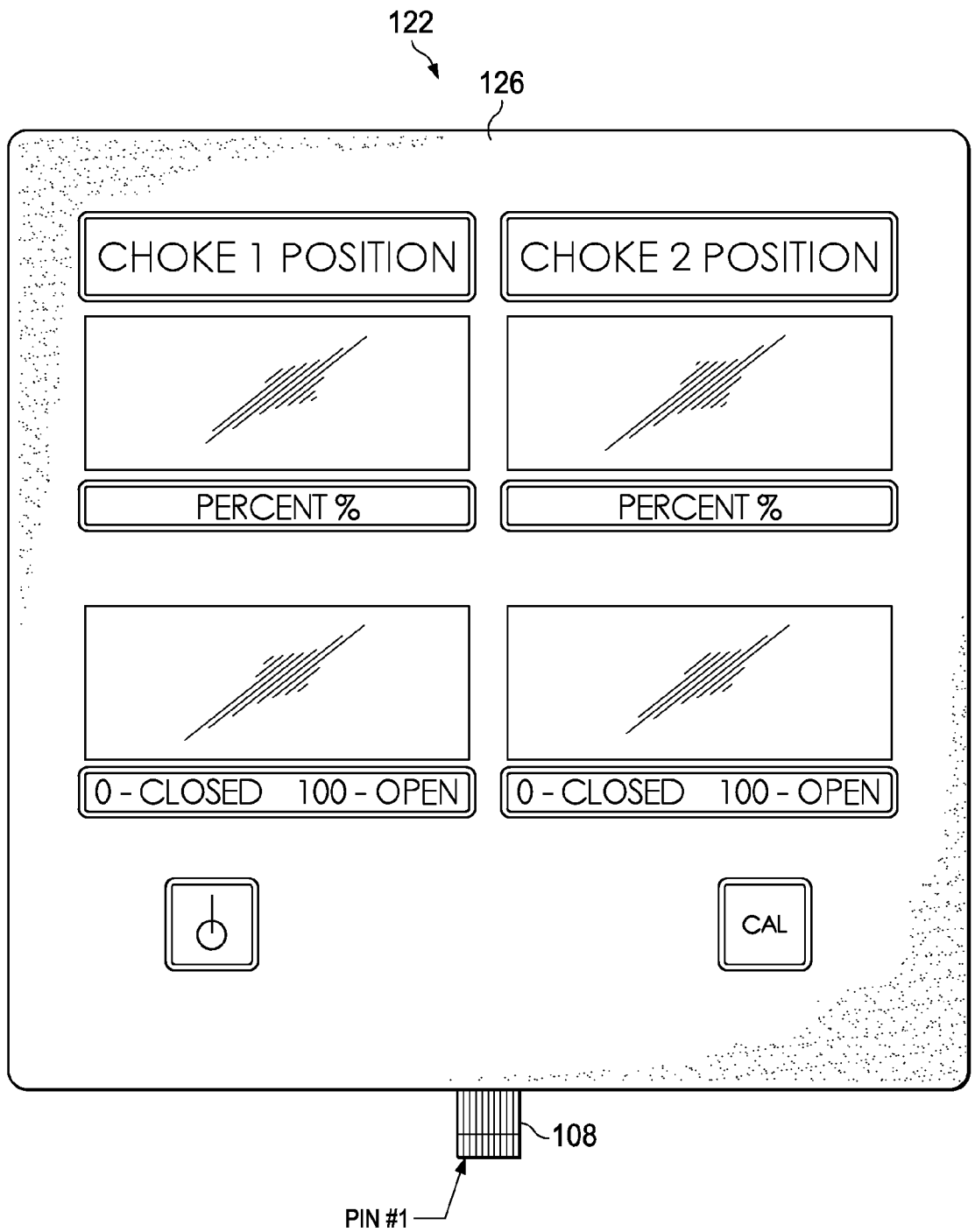
FIG. 9A is a front view of the overlay assembly of FIGS. 7 and 8 according to an exemplary embodiment.
Figure 9B:
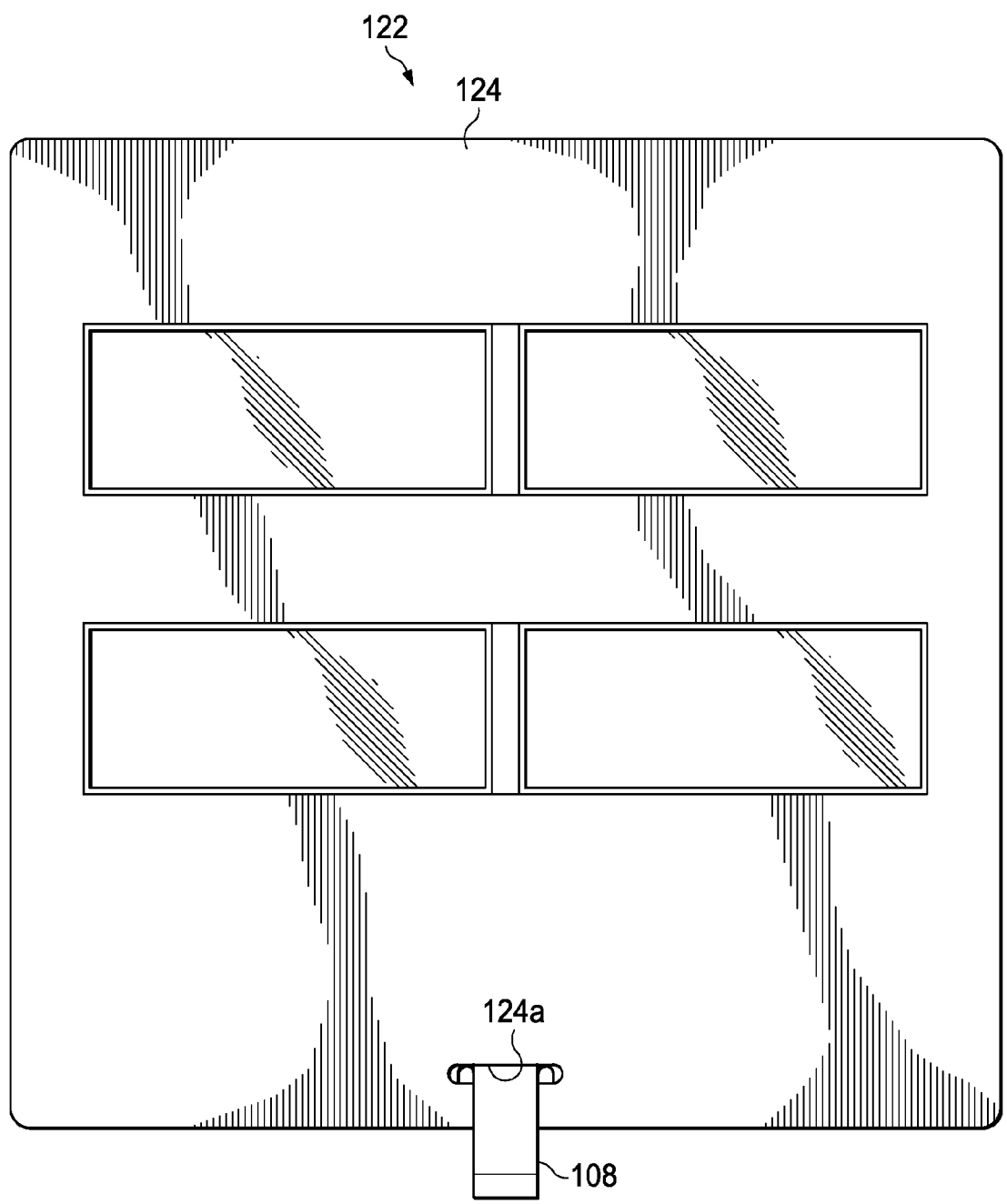
FIG. 9B is a rear view of the overlay assembly of FIGS. 7 and 8 according to an exemplary embodiment.
Figure 10:
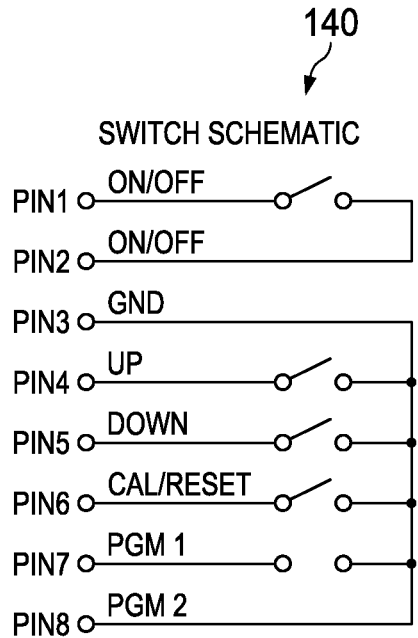
FIG. 10 is a diagrammatic view of a switch schematic of the switch of FIG. 8 according to an exemplary embodiment.

In an exemplary embodiment, as illustrated in FIGS. 9A and 9B with continuing reference to FIGS. 1-8, the graphic overlay 126 indicates choke position of two chokes. The connector 108 is a tail connector having a pin #1. The connector 108 extends generally horizontally through the slot 124a. Referring to FIG. 10, illustrated is a diagrammatic view of a switch schematic 140 of the switch 110. As noted above, in an exemplary embodiment, the connector 102 is a flexible printed circuit (FPC) connector, with which the connector 108 is in electrical communication when the overlay assembly 122 is connected to the lid 120. Under conditions to be described below, the switch 110 electrically communicates with the microcontroller 94, via the connector 108, the connector 102 and the printed circuit board 90, so that the microcontroller 94 recognizes the type of sensor from which it is (or at least should be) receiving digital information (i.e., a position sensor such as the digital hydraulic choke position sensors 30 and 32) and, based on that sensor type, accordingly processes the digital information and displays relevant output specific to that sensor type on one or more of the displays 96a, 96b, 96c and 96d.

In view of the foregoing, in an exemplary embodiment, the digital display unit 14 can be used to monitor either hydraulic chokes or electric chokes.

In an exemplary embodiment, the digital display unit 16 includes components that are identical to corresponding components of the digital display unit 14 described above. These identical components will be referred to by the same reference numerals, followed by the phrase "of the digital display unit 16". The digital display unit 16 differs from the digital display unit 14 in two respects. First, instead of being in electrical communication with the digital hydraulic choke position sensors 30 and 32, the connector 78 of the digital display unit 16 is in electrical communication with the digital pressure sensor 54, as shown in FIG. 2. The second difference is that the digital display unit 16 does not include an overlay assembly that is identical to the overlay assembly 122 of the digital display unit 14. Instead, the digital display unit 16 includes an overlay assembly 142, an exemplary embodiment of which is illustrated in FIG. 11 and described in further detail below.

Figure 11:
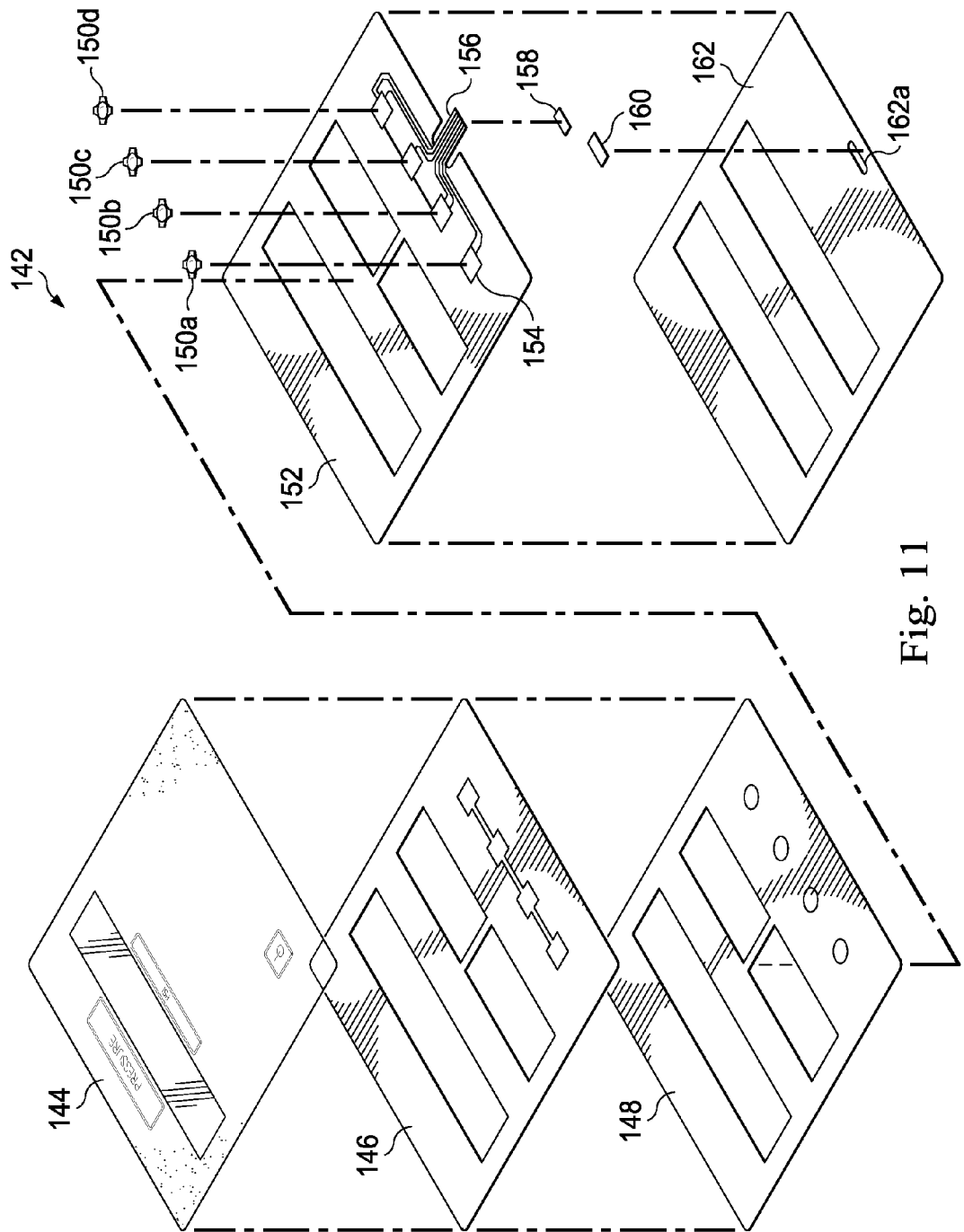
FIG. 11 is an exploded perspective view of an overlay assembly of another of the digital display units of FIG. 1 according to an exemplary embodiment, and the overlay assembly includes another switch.

Referring to FIG. 11 with continuing reference to FIGS. 1-10, the overlay assembly 142 of the digital display unit 16 includes a graphic overlay 144, a dome spacer panel 146, a dome retainer panel 148, buttons or domes 150a, 150b, 150c and 150d, a panel 152 to which a switch 154 is connected, a connector 156, a connector stiffener 158, a connector filler 160, and a mounting adhesive 162. The dome spacer panel 146 is laminated with adhesive on both sides, and is sandwiched between the graphic overlay 144 and the dome retainer panel 148, thereby connecting the graphic overlay 144 to the dome retainer panel 148. The dome retainer panel 148 is backed with an adhesive, which connects the dome retainer panel 148 to the panel 152. The domes 150a, 150b,

150c and 150d are captured between the dome retainer panel 148 and the panel 152. The switch 154 is a circuit, and one or more of the domes 150a, 150b, 150c and 150d may form part of the circuit. The mounting adhesive 162 connects the overlay assembly 142 to the lid 120 of the digital display unit 16. A slot 162a is formed through the mounting adhesive 162.

Figure 13:
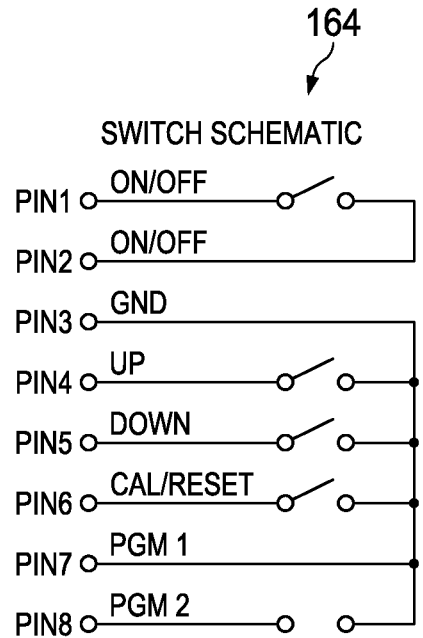
FIG. 13 is a diagrammatic view of a switch schematic of the switch of FIG. 11 according to an exemplary embodiment.
Figure 12A:
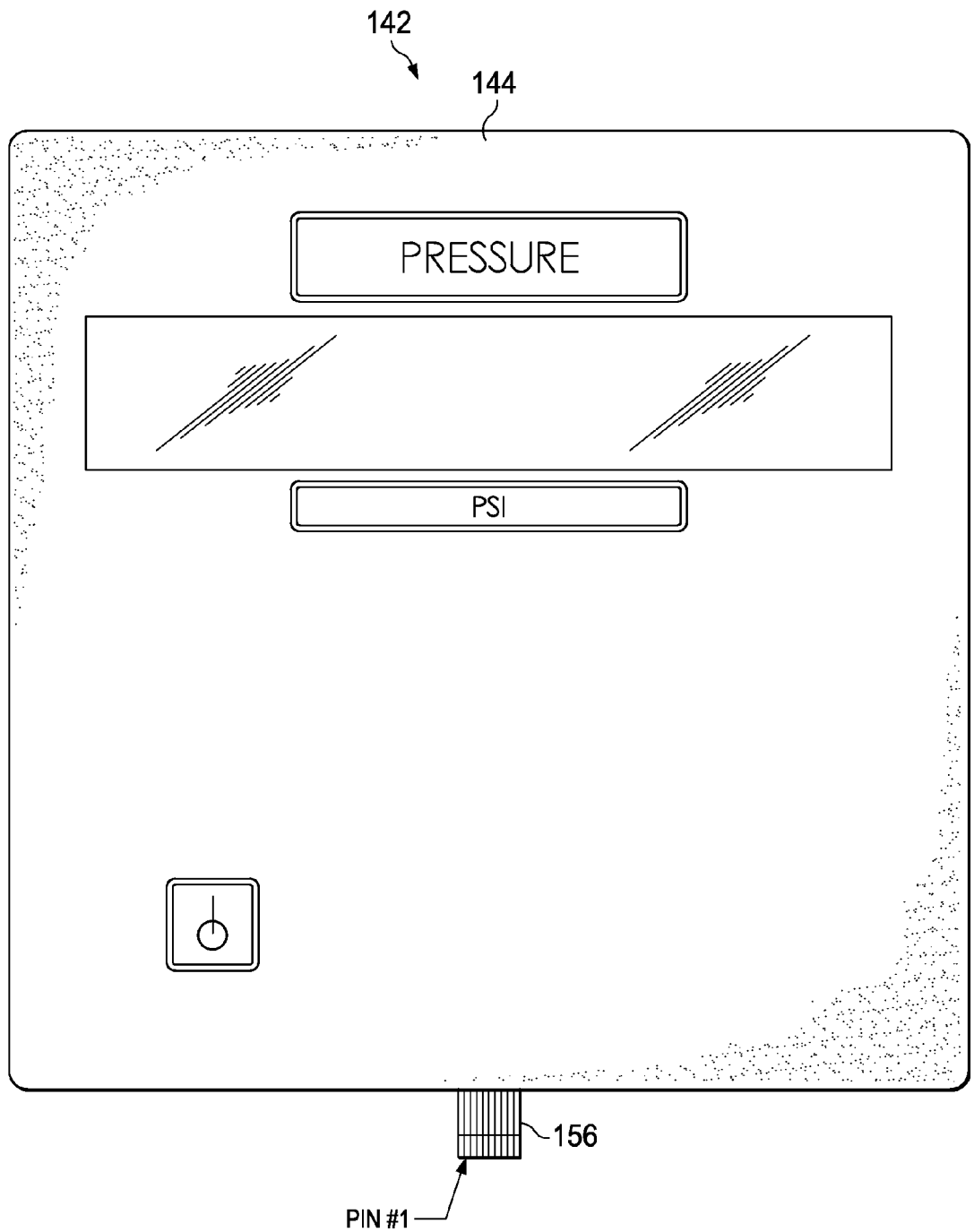
FIG. 12A is a front view of the overlay assembly of FIG. 11 according to an exemplary embodiment.
Figure 12B:
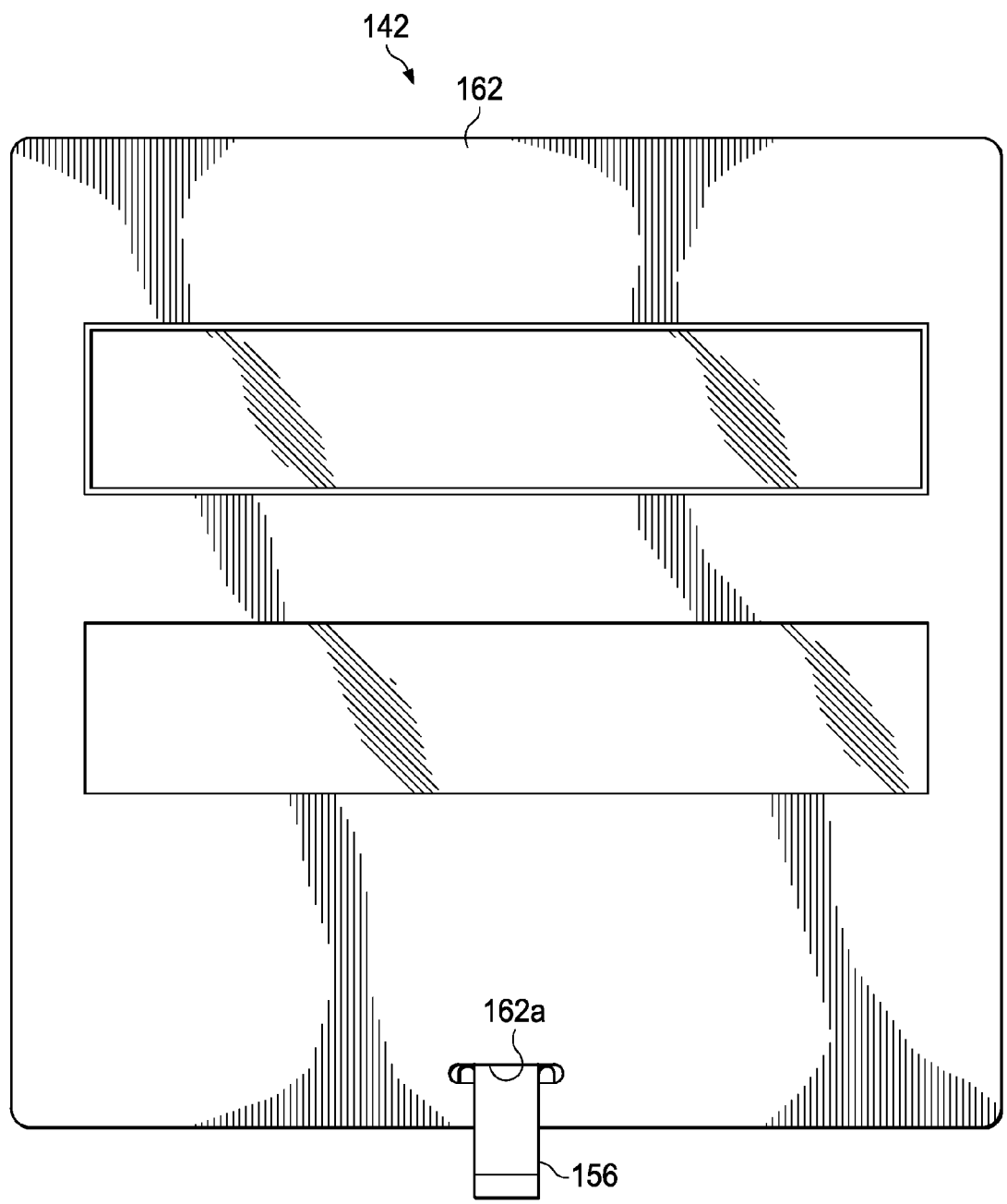
FIG. 12B is a rear view of the overlay assembly of FIG. 11 according to an exemplary embodiment.

In an exemplary embodiment, as illustrated in FIGS. 12A and 12B with continuing reference to FIGS. 1-11, the graphic overlay 144 of the digital display unit 16 indicates a pressure measurement and thus is different from the graphic overlay of the digital unit display 14, which indicates choke position. The connector 156 is a tail connector having a pin #1. The connector 156 extends generally horizontally through the slot 162a. Referring to FIG. 13, illustrated is a diagrammatic view of a switch schematic 164 of the switch 154. The switch 154 is different from the switch 110, as indicated by a comparison between the switch schematic 140 shown in FIG. 10 and the switch schematic 164 shown in FIG. 13. In an exemplary embodiment, the connector 102 of the digital display unit 16 is a flexible printed circuit (FPC) connector, with which the connector 156 is in electrical communication when the overlay assembly 142 is connected to the lid 120 of the digital display unit 16. Under conditions to be described below, the switch 154 electrically communicates with the microcontroller 94 of the digital display unit 16, via the connector 156, the connector 102 of the digital display unit 16, and the printed circuit board 90 of the digital display unit 16, so that the microcontroller 94 of the digital display unit 16 recognizes the type of sensor from which it is (or at least should be) receiving digital information (i.e., a pressure sensor such as the digital pressure sensor 54) and, based on that sensor type, accordingly processes the digital information and displays relevant output specific to that sensor type on one or more of the displays 96a, 96b, 96c and 96d of the digital display unit 16.

The remainder of the digital display unit 16 is identical to the digital display unit 14 and therefore the remainder of the digital display unit 16 will not be described in detail. In an exemplary embodiment, instead of the connector assembly 78 of the digital display unit 16 being in electrical communication with the connector 106, the connector assembly 78 of the digital display unit 16 is in electrical communication with another connector (not shown) that is equivalent to the connector 106 (shown in FIG. 4), which other connector may be coupled to a cable mounting plate (not shown) that is connected to the frame 12.

In an exemplary embodiment, the digital display unit 18 is identical to the digital display unit 16 and therefore will not be described in detail. Instead of being in electrical communication with the digital pressure sensor 54, the connector 78 of the digital display unit 18 is in electrical communication with the digital pressure sensor 56, as shown in FIG. 2. In an exemplary embodiment, the connector assembly 78 of the digital display unit 18 is in electrical communication with yet another connector (not shown) that is equivalent to the connector 106 (shown in FIG. 4), which other connector may be coupled to a cable mounting plate (not shown) that is connected to the frame 12.

In an exemplary embodiment, the digital display unit 20 includes components that are identical to corresponding components of the digital display unit 14 described above. These identical components will be referred to by the same reference numerals, followed by the phrase "of the digital display unit 20". The digital display unit 20 differs from the digital display unit 14 in two respects. First, instead of being in electrical communication with the digital hydraulic choke position sensors 30 and 32, the connector 78 of the digital display unit 20 is in electrical communication with each of the digital stroke counters 40 and 42, as shown in FIG. 2. The second difference is that the digital display unit 20 does not include an overlay assembly that is identical to the overlay assembly 122 of the digital display unit 14. Instead, the digital display unit 16 includes an overlay assembly 166, an exemplary embodiment of which is illustrated in FIG. 14 and described in further detail below.

Figure 14:
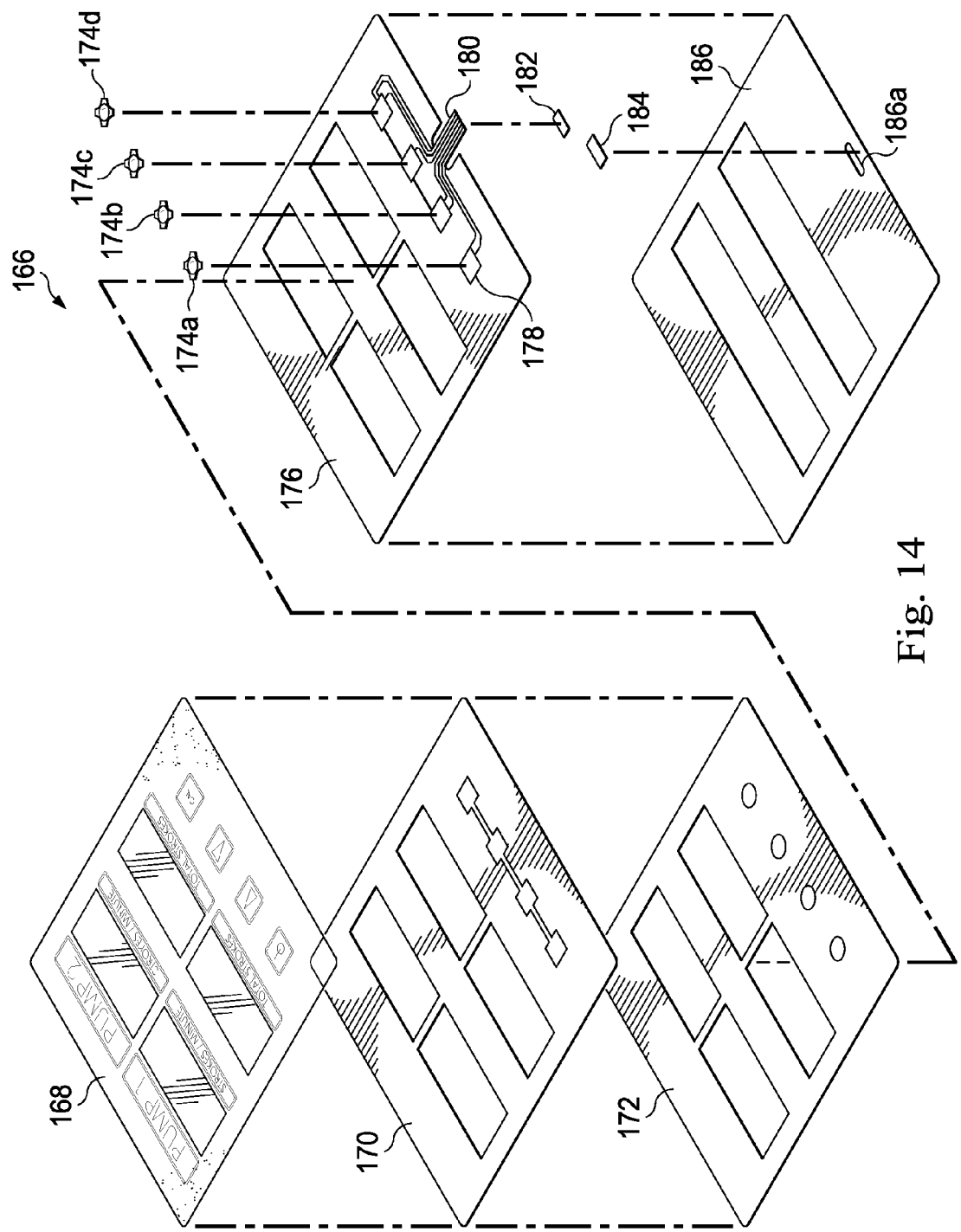
FIG. 14 is an exploded perspective view of an overlay assembly of yet another of the digital display units of FIG. 1 according to an exemplary embodiment, and the overlay assembly includes yet another switch.

Referring to FIG. 14 with continuing reference to FIGS. 1-13, the overlay assembly 166 of the digital display unit 20 includes a graphic overlay 168, a dome spacer panel 170, a dome retainer panel 172, buttons or domes 174a, 174b, 174c and 174d, a panel 176 to which a switch 178 is connected, a connector 180, a connector stiffener 182, a connector filler 184, and a mounting adhesive 186. The dome spacer panel 170 is laminated with adhesive on both sides, and is sandwiched between the graphic overlay 168 and the dome retainer panel 172, thereby connecting the graphic overlay 168 to the dome retainer panel 172. The dome retainer panel 172 is backed with an adhesive, which connects the dome retainer panel 172 to the panel 176. The domes 174a, 174b, 174c and 174d are captured between the dome retainer panel 172 and the panel 176. The switch 178 is a circuit, and one or more of the domes 174a, 174b, 174c and 174d may form part of the circuit. The mounting adhesive 186 connects the overlay assembly 166 to the lid 120 of the digital display unit 20. A slot 186a is formed through the mounting adhesive 186.

Figure 16:
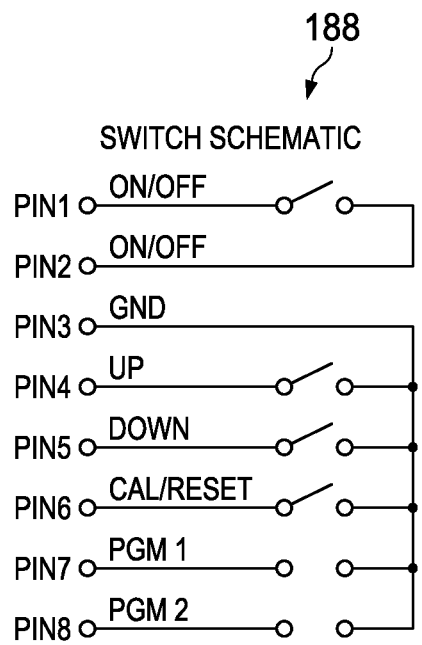
FIG. 16 is a diagrammatic view of a switch schematic of the switch of FIG. 14 according to an exemplary embodiment.
Figure 15A:
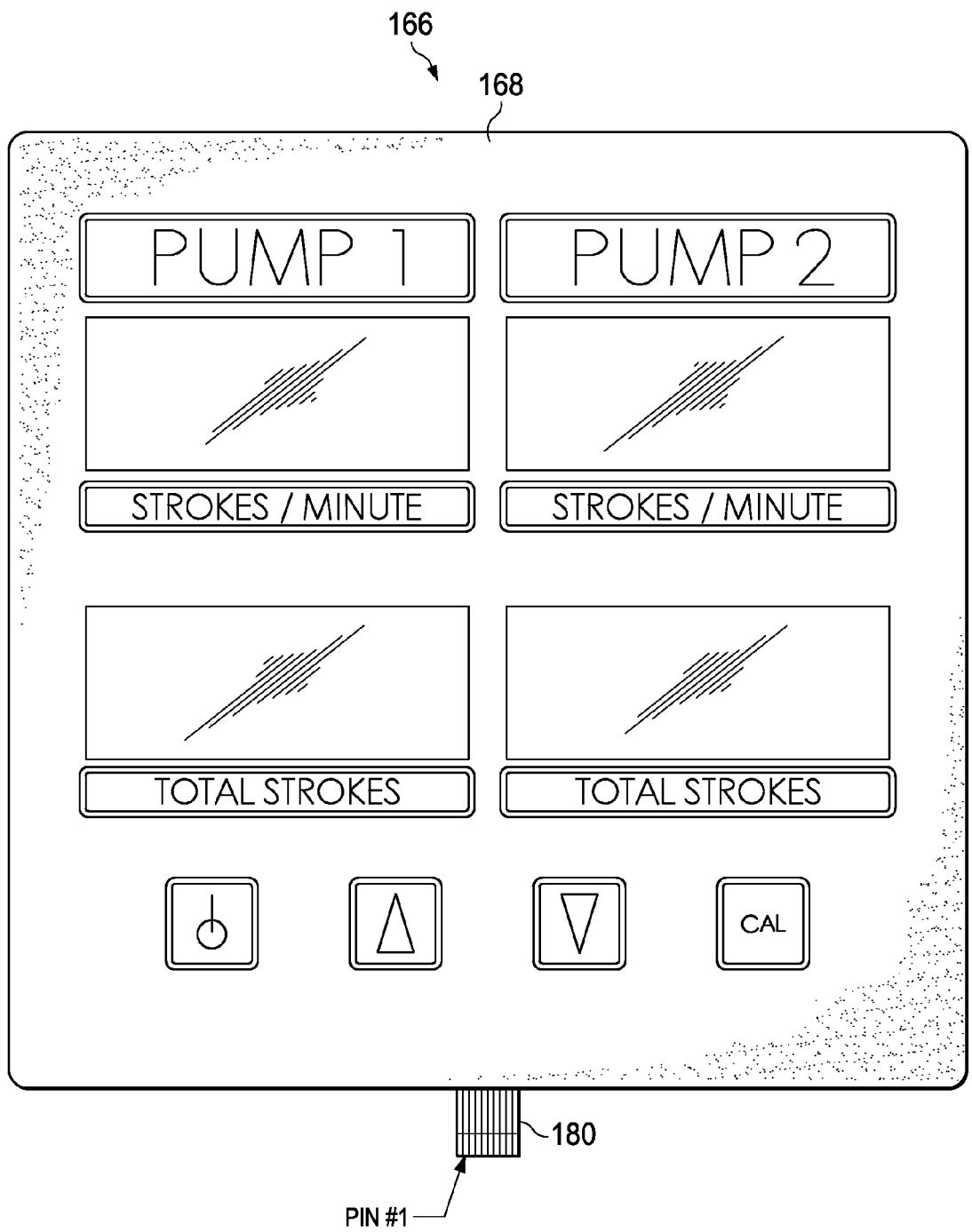
FIG. 15A is a front view of the overlay assembly of FIG. 14 according to an exemplary embodiment.
Figure 15B:
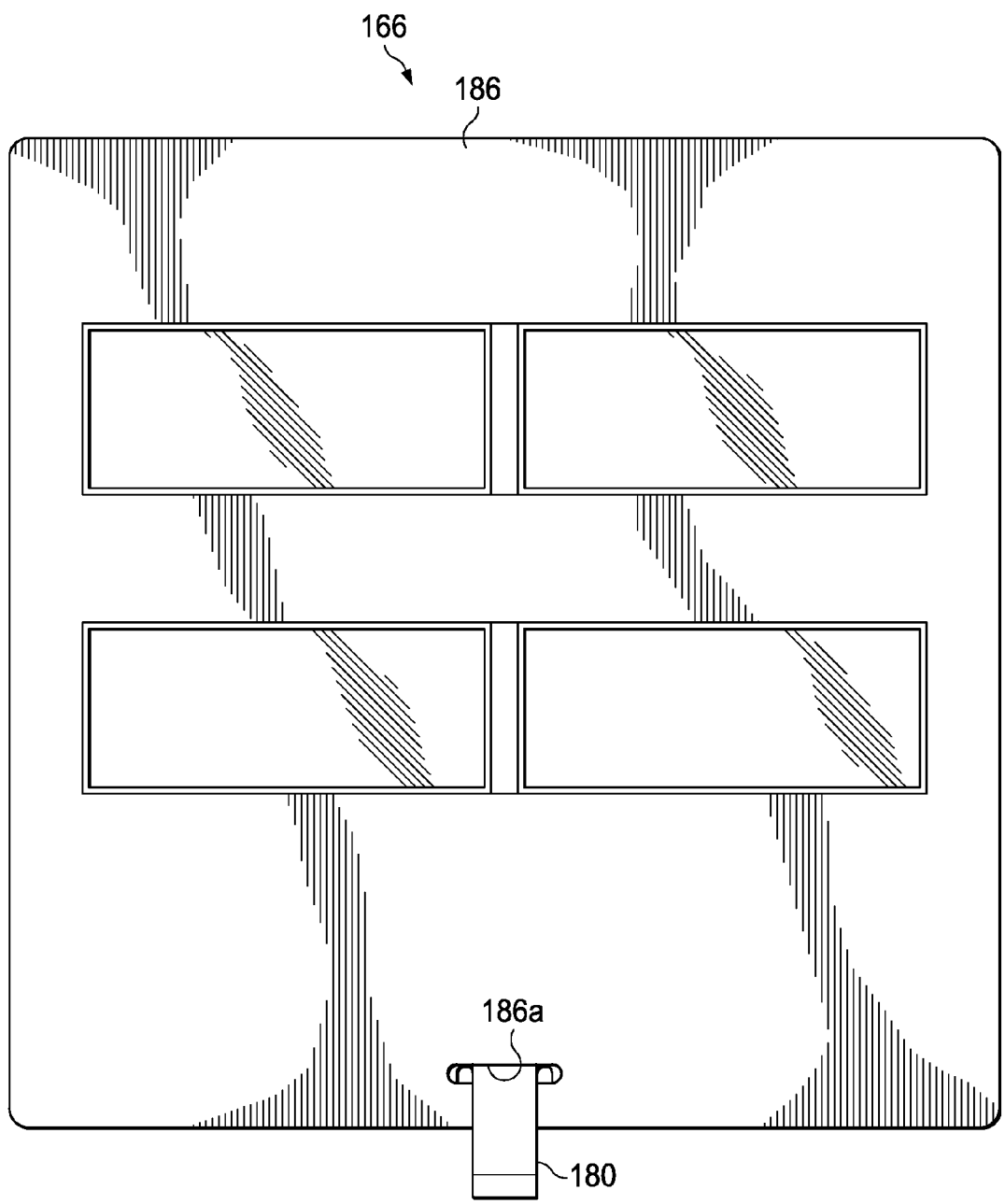
FIG. 15B is a rear view of the overlay assembly of FIG. 14 according to an exemplary embodiment.

In an exemplary embodiment, as illustrated in FIGS. 15A and 15B with continuing reference to FIGS. 1-14, the graphic overlay 168 of the digital display unit 20 indicates stroke count and total strokes, and thus is different from the graphic overlay of the digital unit display 14, which indicates choke position. The connector 180 is a tail connector having a pin #1. The connector 180 extends generally horizontally through the slot 162a. Referring to FIG. 16, illustrated is a diagrammatic view of a switch schematic 188 of the switch 178. The switch 178 is different from each of the switches 110 and 154, as indicated by a comparison between the switch schematic 140 shown in FIG. 10, the switch schematic 164 shown in FIG. 13, and the switch schematic 188 shown in FIG. 16. In an exemplary embodiment, the connector 102 of the digital display unit 20 is a flexible printed circuit (FPC) connector, with which the connector 180 is in electrical communication when the overlay assembly 166 is connected to the lid 120 of the digital display unit 20. Under conditions to be described below, the switch 178 electrically communicates with the microcontroller 94 of the digital display unit 20, via the connector 180, the connector 102 of the digital display unit 20, and the printed circuit board 90 of the digital display unit 20, so that the microcontroller 94 of the digital display unit 20 recognizes the type of sensor from which it is (or at least should be) receiving digital information (i.e., a stroke counter such as the digital stroke counters 40 and 42) and, based on that sensor type, accordingly processes the digital information and displays relevant output specific to that sensor type on one or more of the displays 96a, 96b, 96c and 96d of the digital display unit 20.

The remainder of the digital display unit 20 is identical to the digital display unit 14 and therefore the remainder of the digital display unit 20 will not be described in detail. In an exemplary embodiment, the connector assembly 78 of the digital display unit 20 is in electrical communication with still yet another connector (not shown) that is equivalent to the connector 106 (shown in FIG. 4), which other connector may be coupled to a cable mounting plate (not shown) that is connected to the frame 12.

As indicated above, each of the digital display units 14, 16, 18 and 20 includes a respective combination of the connector assembly 78, the cable assembly 104, and the connector 105; thus, any one of the respective combinations can receive (and transmit) digital information to the corresponding printed circuit board 90 from (or to) any of the sensors, namely the digital hydraulic choke position sensors 30 and 32, the digital stroke counters 40 and 42, the digital pressure sensor 54, or the digital pressure sensor 56. However, the manner in which the corresponding microcontroller 94 processes the received digital information and displays relevant output depends upon which of the switches 110, 154 and 178 is in electrical communication with the microcontroller 94. Additionally, any one combination of the connector assembly 78, the cable assembly 104, and the connector 105 can be used to supply electrical power from the corresponding batteries 76a and 76b to the digital hydraulic choke position sensors 30 and 32, the digital stroke counters 40 and 42, the digital pressure sensor 54, or the digital pressure sensor 56. In an exemplary embodiment, each of the connector assembly 78 and the connector 105 may have fourteen pins, two of which are associated with the digital hydraulic choke position sensor 30, two of which are associated with the digital hydraulic choke position sensor 32, three of which are associated with the digital stroke counter 40, three of which are associated with the digital stroke counter 42, and four of which are associated with the digital pressure sensors 54 and 56.

In operation, in an exemplary embodiment, with continuing reference to FIGS. 1-16, the choke control panel 10 is used to monitor one or more operation parameters during the operation of at least the portion illustrated in FIG. 2 of the system 24 for drilling an oil or gas well, and also to control the hydraulic chokes 26 and 28 from the location of the choke control panel 10.

In an exemplary embodiment, during the operation of the system 24, one or both of the pumps 50 and 52 facilitate the circulation of drilling fluid or mud down through a drilling or casing string that extends within a wellbore, and up through an annular region defined between the wellbore and the drilling or casing string. One or both of the hydraulic chokes 26 and 28 may be opened and/or closed to control the imposition of backpressure on the drilling fluid. In several exemplary embodiments, one or both of the hydraulic chokes 26 and 28 may be controlled by opening and/or closing the hydraulic chokes 26 and 28 using the hydraulic control equipment 22 of the choke control panel 10, including the joystick 22a. This control of the hydraulic chokes 26 and 28 may be informed by monitoring, using the choke control panel 10, one or more operation parameters including, but not limited to, the respective stroke counts (and thus flow rate indications) of the pumps 50 and 52, the pressure at the standpipe 62, the pressure at the casing 64, and the respective choke positions of the hydraulic chokes 26 and 28.

In an exemplary embodiment, to monitor the respective choke positions of the hydraulic chokes 26 and 28, the digital hydraulic choke position sensors 30 and 32 sense the degree to which the hydraulic chokes 26 and 28 are open or closed, and then transmit digital readings or information corresponding to the sensed open/closed degrees to the digital display unit 14. The digital hydraulic choke position sensor 30 transmits the digital information to the digital display unit 14 via the cable assemblies 34 and 36. The digital hydraulic choke position sensor 32 transmits the digital information to the digital display unit 14 via the cable assemblies 38 and 36. At the digital display unit 14, the digital information from the digital hydraulic choke position sensors 30 and 32 is transmitted to the microcontroller 94 of the digital display unit 14 via the connector 106, and the connector assembly 78, the cable assembly 104, the connector 105, the connector 100, and the printed circuit board 90 of the digital display unit 14. The switch 110 electrically communicates with the microcontroller 94 of the digital display unit 14, via the connector 108, the connector 102 and the printed circuit board 90 of the digital display unit 14, so that the microcontroller 94 of the digital display unit 14 recognizes the type of sensor from which it is (or at least should be) receiving digital information, namely a position sensor, such as the digital hydraulic choke position sensors 30 and 32. Based on this recognition, the microcontroller 94 accordingly processes the digital information and outputs relevant digital output specific to that sensor type on one or more of the displays 96a, 96b, 96c and 96d of the digital display unit 14. In an exemplary embodiment, the microcontroller 94 of the digital display unit 14 may output one or more values corresponding to the degree to which the hydraulic chokes 26 and 28 are open or closed; such values include, for example, the percentage that the hydraulic choke 26 is open on the display 96a of the digital display unit 14, a number indicating the degree to which the hydraulic choke 26 is open on the display 96c of the digital display unit 14, the percentage that the hydraulic choke 28 is open on the display 96b of the digital display unit 14, and a number indicating the degree to which the hydraulic choke 26 is open on the display 96d of the digital display unit 14.

Before, during and/or after the transmission of digital information to the digital display unit 14, the batteries 76a and 76b of the digital display unit 14 supply electrical power to the electrical components on the printed circuit board 90 of the digital display unit 14, including the microcontroller 94. The batteries 76a and 76b of the digital display unit 14 supply electrical power to such components via the respective holders 70a and 70b, the cable assembly 114, the connector 112, the connector 98, and the printed circuit board 90 of the digital display unit 14. Additionally, before, during and/or after the transmission of digital information to the digital display unit 14, the batteries 76a and 76b of the digital display unit 14 supply electrical power to the digital hydraulic choke position sensors 30 and 32 via the respective holders 70a and 70b, the cable assembly 114, the connector 112, the connector 98, the printed circuit board 90, the connector 100, the cable assembly 104, and the connector 78 of the digital display unit 14, as well as the connector 106, the cable assembly 36, and the respective cable assemblies 34 and 38.

In an exemplary embodiment, to monitor the pressure at the standpipe 62, the digital pressure sensor 54 senses the pressure at the standpipe 62, and then transmits digital readings or information corresponding to the sensed pressure to the digital display unit 16. The digital pressure sensor 54 transmits the digital information to the digital display unit 16 via the cable assembly 58. At the digital display unit 16, the digital information from the digital pressure sensor 54 is transmitted to the microcontroller 94 of the digital display unit 16 via a connector that is equivalent to the connector 106, and also via the connector assembly 78, the cable assembly 104, the connector 105, the connector 100, and the printed circuit board 90 of the digital display unit 16. The switch 154 electrically communicates with the microcontroller 94 of the digital display unit 16, via the connector 108, the connector 102 and the printed circuit board 90 of the digital display unit 16, so that the microcontroller 94 of the digital display unit 16 recognizes the type of sensor from which it is (or at least should be) receiving digital information, namely a pressure sensor, such as the digital pressure sensor 54. Based on this recognition, the microcontroller 94 accordingly processes the digital information and outputs relevant digital output specific to that sensor type on one or more of the displays 96*a*, 96*b*, 96*c* and 96*d* of the digital display unit 16. In an exemplary embodiment, the microcontroller 94 of the digital display unit 16 may output, for example, the pressure value at the standpipe 62 on one or both of the displays 96*a* and 96*b* of the digital display unit 16.

Before, during and/or after the transmission of digital information to the digital display unit 16, the batteries 76*a* and 76*b* of the digital display unit 16 supply electrical power to the electrical components on the printed circuit board 90 of the digital display unit 16, including the microcontroller 94. The batteries 76*a* and 76*b* of the digital display unit 16 supply electrical power to such components via the respective holders 70*a* and 70*b*, the cable assembly 114, the connector 112, the connector 98, and the printed circuit board 90 of the digital display unit 16. Additionally, before, during and/or after the transmission of digital information to the digital display unit 16, the batteries 76*a* and 76*b* of the digital display unit 16 supply electrical power to the digital pressure sensor 54 via the respective holders 70*a* and 70*b*, the cable assembly 114, the connector 112, the connector 98, the printed circuit board 90, the connector 100, the cable assembly 104, and the connector 78 of the digital display unit 16, as well as a connector that is equivalent to the connector 106, and the cable assembly 58.

In an exemplary embodiment, to monitor the pressure at the casing 64, the digital pressure sensor 56 senses the pressure at the casing 64, and then transmits digital readings or information corresponding to the sensed pressure to the digital display unit 18. The digital pressure sensor 56 transmits the digital information to the digital display unit 18 via the cable assembly 60. At the digital display unit 18, the digital information from the digital pressure sensor 56 is transmitted to the microcontroller 94 of the digital display unit 18 via a connector that is equivalent to the connector 106, and also via the connector assembly 78, the cable assembly 104, the connector 105, the connector 100, and the printed circuit board 90 of the digital display unit 18. The switch 178 electrically communicates with the microcontroller 94 of the digital display unit 18, via the connector 108, the connector 102 and the printed circuit board 90 of the digital display unit 18, so that the microcontroller 94 of the digital display unit 16 recognizes the type of sensor from which it is (or at least should be) receiving digital information, namely a pressure sensor, such as the digital pressure sensor 56. Based on this recognition, the microcontroller 94 accordingly processes the digital information and outputs relevant digital output specific to that sensor type on one or more of the displays 96*a*, 96*b*, 96*c* and 96*d* of the digital display unit 18. In an exemplary embodiment, the microcontroller 94 of the digital display unit 18 may output, for example, a pressure value at the casing 64 on one or both of the displays 96*a* and 96*b* of the digital display unit 18.

Before, during and/or after the transmission of digital information to the digital display unit 18, the batteries 76*a* and 76*b* of the digital display unit 18 supply electrical power to the electrical components on the printed circuit board 90 of the digital display unit 18, including the microcontroller 94. The batteries 76*a* and 76*b* of the digital display unit 18 supply electrical power to such components via the respective holders 70*a* and 70*b*, the cable assembly 114, the connector 112, the connector 98, and the printed circuit board 90 of the digital display unit 18. Additionally, before, during and/or after the transmission of digital information to the digital display unit 18, the batteries 76*a* and 76*b* of the digital display unit 18 supply electrical power to the digital pressure sensor 56 via the respective holders 70*a* and 70*b*, the cable assembly 114, the connector 112, the connector 98, the printed circuit board 90, the connector 100, the cable assembly 104, and the connector 78 of the digital display unit 18, as well as a connector that is equivalent to the connector 106, and the cable assembly 60.

In an exemplary embodiment, to monitor the respective stroke counts (and thus flow rate indications) of the pumps 50 and 52, the digital stroke counters 40 and 42 sense the respective strokes of the pumps 50 and 52, and then transmit digital readings or information corresponding to the sensed strokes to the digital display unit 20. The digital stroke counter 40 transmits the digital information to the digital display unit 20 via the cable assemblies 44 and 46. The digital stroke counter 42 transmits the digital information to the digital display unit 20 via the cable assemblies 48 and 46. At the digital display unit 20, the digital information from the digital stroke counters 40 and 42 is transmitted to the microcontroller 94 of the digital display unit 20 via a connector that is equivalent to the connector 106, and the connector assembly 78, the cable assembly 104, the connector 105, the connector 100, and the printed circuit board 90 of the digital display unit 20. The switch 178 electrically communicates with the microcontroller 94 of the digital display unit 20, via the connector 108, the connector 102 and the printed circuit board 90 of the digital display unit 20, so that the microcontroller 94 of the digital display unit 20 recognizes the type of sensor from which it is (or at least should be) receiving digital information, namely a stroke counter, such as the digital stroke counters 40 and 42. Based on this recognition, the microcontroller 94 accordingly processes the digital information and outputs relevant digital output specific to that sensor type on one or more of the displays 96*a*, 96*b*, 96*c* and 96*d* of the digital display unit 20. In an exemplary embodiment, the microcontroller 94 of the digital display unit 20 may output, for example, a stroke rate such as the strokes per minute of the pump 50 on the display 96*a* of the digital display unit 20, the total strokes of the pump 50 on the display 96*c* of the digital display unit 20, a stroke rate such as the strokes per minute of the pump 52 on the display 96*b* of the digital display unit 20, and the total strokes of the pump 52 on the display 96*d* of the digital display unit 20.

Before, during and/or after the transmission of digital information to the digital display unit 20, the batteries 76*a* and 76*b* of the digital display unit 20 supply electrical power to the electrical components on the printed circuit board 90 of the digital display unit 20, including the microcontroller 94. The batteries 76*a* and 76*b* of the digital display unit 20 supply electrical power to such components via the respective holders 70*a* and 70*b*, the cable assembly 114, the connector 112, the connector 98, and the printed circuit board 90 of the digital display unit 20. Additionally, before, during and/or after the transmission of digital information to the digital display unit 20, the batteries 76*a* and 76*b* of the digital display unit 20 supply electrical power to the digital stroke counters 40 and 42 via the respective holders 70*a* and 70*b*, the cable assembly 114, the connector 112, the connector 98, the printed circuit board 90, the connector 100, the cable assembly 104, and the connector 78 of the digital display unit 20, as well as a connector that is equivalent to the connector 106, the cable assembly 46, and the respective cable assemblies 44 and 48.

As indicated above, each of the digital display units 14, 16, 18 and 20 includes a respective combination of the connector assembly 78, the cable assembly 104, and the connector 105; thus, any one of the respective combinations can receive and transmit digital information to the corresponding printed circuit board 90 from the digital hydraulic choke position sensors 30 and 32, the digital stroke counters 40 and 42, the digital pressure sensor 54, or the digital pressure sensor 56. However, the manner in which the corresponding microcontroller 94 processes the received digital information and displays relevant output depends upon which of the switches 110, 154 and 178 is in electrical communication with the microcontroller 94. Additionally, any one combination of the connector assembly 78, the cable assembly 104, and the connector 105 can be used to supply electrical power from the corresponding batteries 76a and 76b to the digital hydraulic choke position sensors 30 and 32, the digital stroke counters 40 and 42, the digital pressure sensor 54, or the digital pressure sensor 56.

In view of the foregoing, in an exemplary embodiment, the use of the digital display units 14, 16, 18 and 20 provides better monitoring accuracy and acuity, and higher incremental resolution of the values of different operation parameters, when compared to the use of analog gauges for the same operation parameters.

In view of the foregoing, in an exemplary embodiment, the commonality in components between the digital display units 14, 16, 18 and 20 facilitates the maintenance of the digital display units, reduces manufacturing and maintenance costs, and increases the usefulness of spare parts because the spare parts can be used on different ones of the digital display units 14, 16, 18 and 20. In several exemplary embodiments, all of the above-described components in each of the digital display units 14, 16, 18 and 20 may be common, or identical, with the exception of some of the parts in the overlay assemblies 122, 142 and 166; such uncommon or different parts may include the switches 110, 154 and 178, and the graphic overlays 126, 144 and 128. The uniformity of the digital display units 14, 16, 18 and 20 reduces costs because parts can be purchased in large quantities, and reduces the number of components a service call technician needs to have available when making remote service calls.

In view of the foregoing, in an exemplary embodiment, any one of the digital display units 14, 16, 18 and 20 may be easily interchanged with any other of the digital display units 14, 16, 18 and 20 by just interchanging the respective overlay assemblies 66.

In view of the foregoing, in an exemplary embodiment, as noted above, the digital display unit 14 is operable with either hydraulic chokes or electric chokes.

In view of the foregoing, in an exemplary embodiment, the ability of each of the digital display units 14, 16, 18 or 20 to supply electrical power to the sensor(s) with which it is in electrical communication (the sensors 30 and 32, the sensor 54, the sensor 56, or the sensors or counters 40 and 42) eliminates the susceptibility of the choke control panel 10 to power losses from another source, such as a drilling rig that is part of the system 24. In other words, the choke control panel 10 may be operated without being dependent upon the supply of electrical power from the drilling rig. The choke control panel 10 operates independently of other electrical power sources. Additionally, the sensors 30 and 32, the sensor 54, the sensor 56, and the counters 40 and 42 operate with their own respective electrical power sources (i.e., the batteries 76a and 76b of the corresponding digital display unit 14, 16, 18 and 20), independently of the other electrical powers sources in the choke control panel 10.

Figure 19:
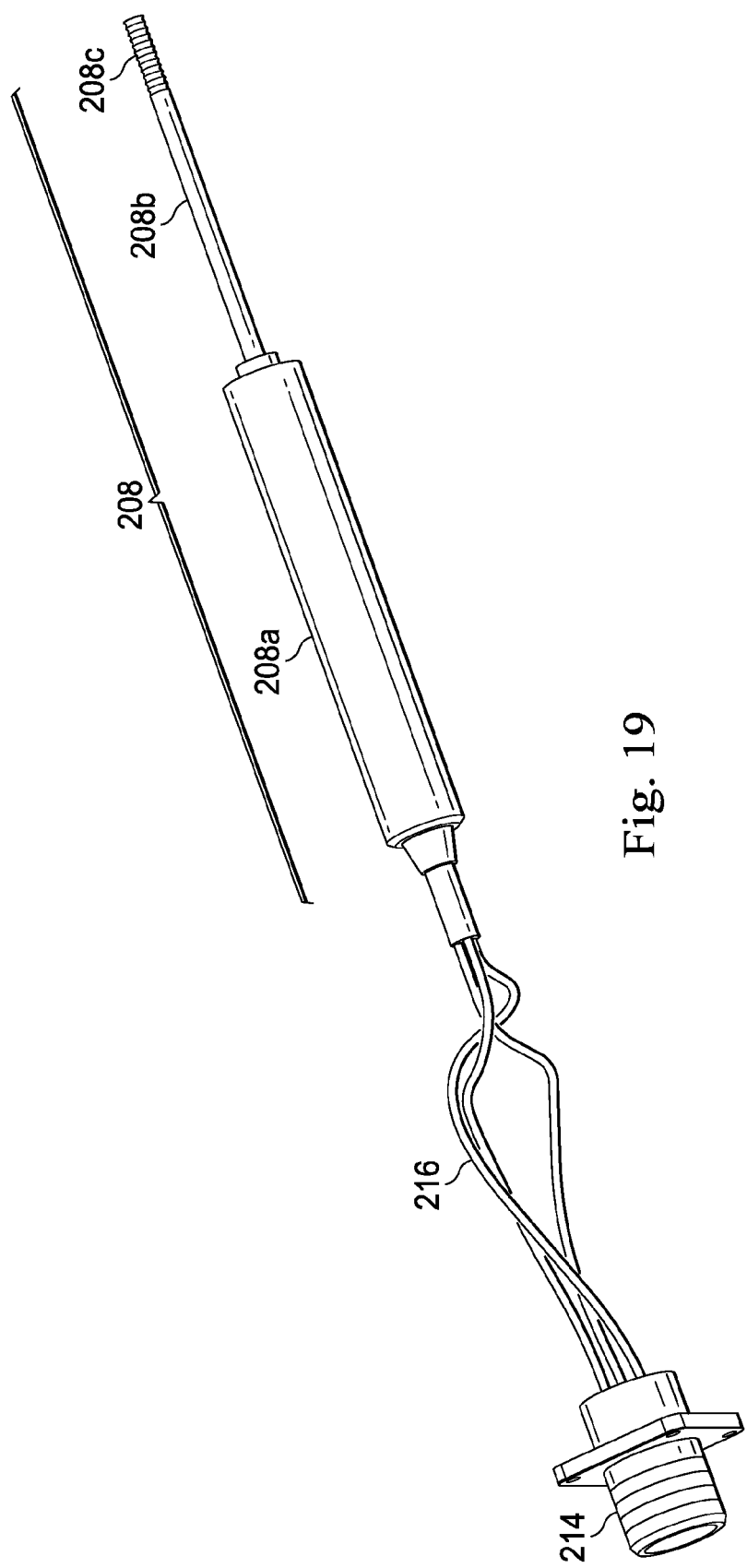
FIG. 19 is a perspective view of a portion of the sensor of FIGS. 17 and 18 according to an exemplary embodiment.

In an exemplary embodiment, as illustrated in FIGS. 17, 18 and 19 with continuing reference to FIGS. 1-16, the digital hydraulic choke position sensor 30 is an assembly that includes a housing 194 and a sleeve 196 connected thereto. An end portion 194a of the housing 194 extends within the sleeve 196, and an opposing end portion 194b includes a flange 194c. A region 200 is formed in the end portion 194a, defining an axially-facing surface 194d of the housing 194. Radially-extending bores 202a and 202b are formed through the housing 194 adjacent the region 200. A longitudinally-extending passage 204 is defined by the housing 194. The passage 204 includes a reduced-diameter portion 204a adjacent the region 200, and an enlarged-diameter portion 204b that extends from the reduced-diameter portion 204a to the end portion 194b. Radially-extending bores 206a and 206b are formed through the housing 194 adjacent the reduced-diameter portion 204a.

A digital position sensor 208 extends within the longitudinally-extending passage 204 defined by the housing 194. In an exemplary embodiment, the digital position sensor 208 is, includes, or is part of, a linear potentiometer. In an exemplary embodiment, the digital position sensor 208 is, includes, or is part of, an Omega® LP803-02 linear potentiometer. In an exemplary embodiment, the digital position sensor 208 includes a tubular enclosure 208a and a rod 208b extending therein. The rod 208b is movable relative to the tubular enclosure 208a. Respective portions of the tubular enclosure 208a and the rod 208b extend through a compression spring 210.

An actuator button 212 is connected to the distal end of the rod 208b and includes an external shoulder 212a. In an exemplary embodiment, the actuator button 212 is connected to the distal end portion of the rod 208b via a threaded engagement with an external threaded connection 208c at the distal end portion of the rod 208b. The compression spring 210 extends between the external shoulder 212a and a frusto-conical transition internal surface 194e of the housing 194, which internal surface extends between the portions 204a and 204b of the passage 204. As shown in FIG. 19, a connector assembly 214 is in electrical communication with the digital position sensor 208 via a cable assembly 216 (the cable assembly 16 is not shown in FIG. 18). In an exemplary embodiment, the connector assembly 214 may be characterized as part of the cable assembly 216, and/or the connector assembly 214 and the cable assembly 216 may be characterized as part of the digital position sensor 208. As shown in FIG. 18, the connector assembly 214 is connected to the axially-facing surface 194d. Although not shown in FIG. 18, the cable assembly 216 is disposed in the reduced-diameter portion 204a of the passage 204. The connector assembly 214 is connected to, and in electrical communication with, the cable assembly 34, as indicated in FIG. 2.

As shown in FIG. 18, the sleeve 196 includes radially-extending bores 196a and 196b, which are concentric with the radially-extending bores 206a and 206b, respectively. Set screws 218a and 218b are positioned in the radially-extending bores 206a and 206b, respectively, and engage the tubular enclosure 208a, holding the digital position sensor 208 in place within the longitudinally-extending passage 204. Fasteners, such as cap screws 220a and 220b, extend through the bores 196a and 196b, respectively, and into the bores 206a and 206b, respectively. The cap screws 220a and 220b connect the sleeve 196 to the housing 194 and hold in place the set screws 218a and 218b, respectively, thereby ensuring that the digital position sensor 208 is held in place by the set screws 218a and 218b.

The flange 194c of the housing 194 is connected to a corresponding flange (not shown) of the hydraulic choke 26. An end of an actuator rod 26a of the hydraulic choke 26 engages the end face of the actuator button 212 opposing the external shoulder 212a.

In operation, in an exemplary embodiment, as the hydraulic choke 26 is opened using the hydraulic control equipment 22, the actuator rod 26a moves to the right, as viewed in FIG. 18, causing the actuator button 212 to also move to the right, as viewed in FIG. 18. As a result, the spring 210 is compressed, the rod 208*b* moves relative to the tubular enclosure 208*a*, and the movement of the rod 208*b* is sensed by the digital position sensor 208. In response, the digital position sensor 208 transmits or outputs digital information corresponding to the sensed movement to the digital display unit 14 via the cable assembly 216, the connector assembly 214, and the cable assemblies 34 and 36, in accordance with the foregoing. As the hydraulic choke 26 is closed using the hydraulic control equipment 22, the actuator rod 26*a* moves to the left, as viewed in FIG. 18. As a result, the spring 210 decompresses, pushing the actuator button 212 and thus the rod 208*b*, relative to the tubular enclosure 208*a* and to the left, as viewed in FIG. 18, and maintaining the engagement between the actuator button 212 and the actuator rod 26*a*. In response, the digital position sensor 208 transmits or outputs digital information corresponding to the sensed movement of the rod 208*b* relative to the tubular enclosure 208*a*. This digital information is transmitted to the digital display unit 14 via the cable assembly 216, the connector assembly 214, and the cable assemblies 34 and 36, in accordance with the foregoing. Before, during and/or after this transmission of digital information, the digital position sensor 208 of the digital hydraulic choke position sensor 30 is electrically powered by the batteries 76*a* and 76*b* of the digital display unit 14 via the cable assemblies 34 and 36, the connector assembly 214, and the cable assembly 216, in accordance with the foregoing.

In view of the foregoing, in several exemplary embodiments, it is clear that the digital hydraulic choke position sensor 30 of FIGS. 17-19 permits digital sensing or measurement of the degree to which the hydraulic choke 26 is opened or closed, without requiring any modifications to the hydraulic choke 26 to accommodate the digital sensing or measurement. In several exemplary embodiments, the digital hydraulic choke position sensor 30 of FIGS. 17-19 enables the use of a digital gauge output, on the displays 96*a*, 96*b*, 96*c* and 96*d* of the digital display unit 14, to monitor the choke position of a hydraulic choke, namely the hydraulic choke 26. In several exemplary embodiments, the digital position sensor 208 is protected from the environment by the housing 194. In several exemplary embodiments, the connection between the connector assembly 214 and the cable assembly 34 is protected by the sleeve 196. In an exemplary embodiment, the sleeve 196 may be disconnected from the housing 194, and a bar (not shown) may be inserted through the bores 202*a* and 202*b* and used as a handle to carry the housing 194 as necessary.

In an exemplary embodiment, the digital hydraulic choke position sensor 32 is identical to the exemplary embodiment of the digital hydraulic choke position sensor 30 illustrated in FIGS. 17-19, and therefore neither the digital hydraulic choke position sensor 32 nor the operation thereof will be described in detail. Instead of being connected to the hydraulic choke 26, the digital hydraulic choke position sensor 32 is connected to the hydraulic choke 28, as indicated in FIG. 2. Instead of being connected to, and in electrical communication with, the cable assembly 34, the connector assembly 214 of the digital hydraulic choke position sensor 32 is connected to, and in electrical communication with, the cable assembly 38, as indicated in FIG. 2.

In an exemplary embodiment, as illustrated in FIGS. 20, 21, 22 and 23 with continuing reference to FIGS. 1-19, the digital pressure sensor 54 is an assembly that includes a handle assembly 224, a connector 226, a cover 228, a plurality of fasteners 230, a sensor assembly 232 (FIGS. 21-23), an annular sealing element such as an O-ring 234 (FIGS. 21 and 23), and a base 236.

Figure 22:
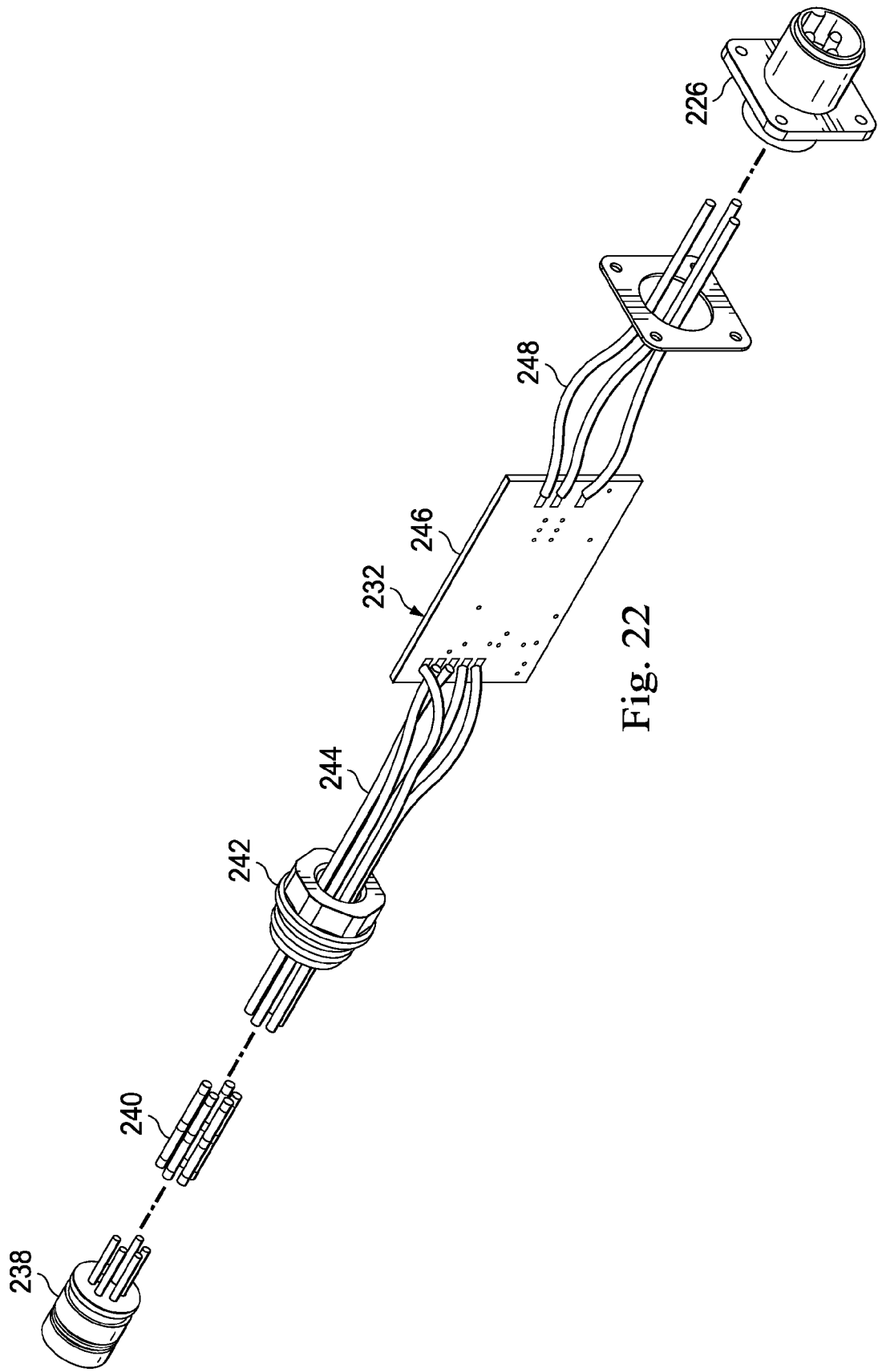
FIG. 22 is an exploded perspective view of a portion of the sensor of FIGS. 20 and 21 according to an exemplary embodiment.

As shown in FIG. 22, the sensor assembly 232 includes a pressure transducer 238, a plurality of solder sleeves 240, a nut 242, a cable assembly 244, a printed circuit board 246, and a cable assembly 248, which is connected to, and in electrical communication with, the connector 226. In an exemplary embodiment, the connector 226 may be characterized as part of the sensor assembly 232. In an exemplary embodiment, the pressure transducer 238 is a Keller Series 8 Pressure Transducer. The printed circuit board 246 is in electrical communication with the pressure transducer 238 via the cable assembly 244 and the solder sleeves 240. The connector 226 is in electrical communication with the printed circuit board 246 via the cable assembly 248. The connector 226 is also in electrical communication with the cable assembly 58, as indicated in FIG. 2. Under conditions to be described below, the pressure transducer 238 senses fluid pressure, and one or more components of the printed circuit board 246 output digital information corresponding to the sensed fluid pressure.

Figure 20:
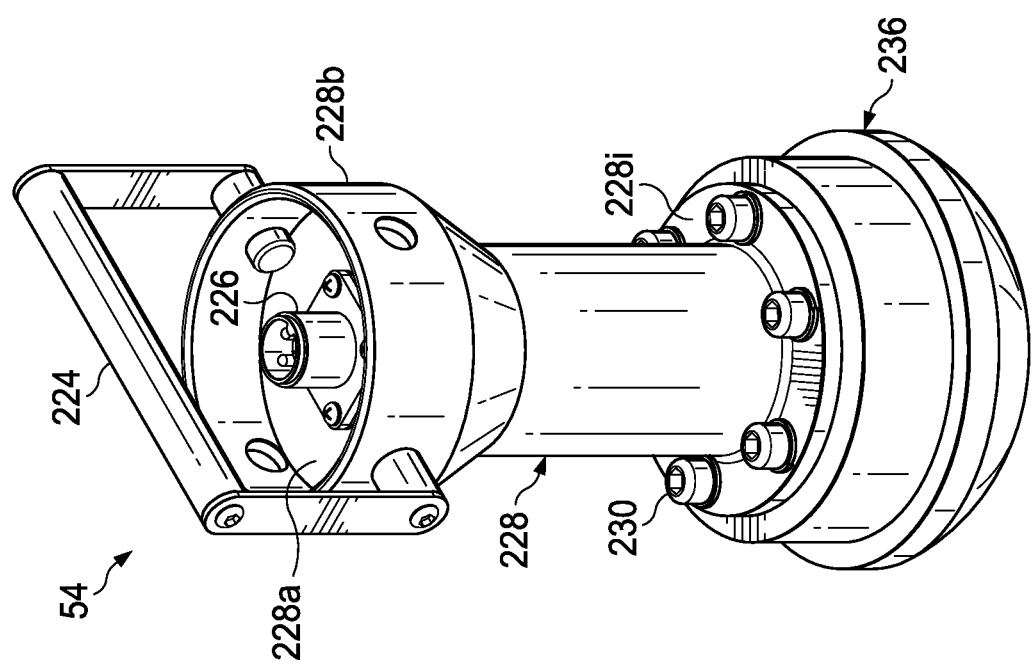
FIG. 20 is a perspective view of another of the sensors of FIG. 2 according to an exemplary embodiment.
Figure 21:
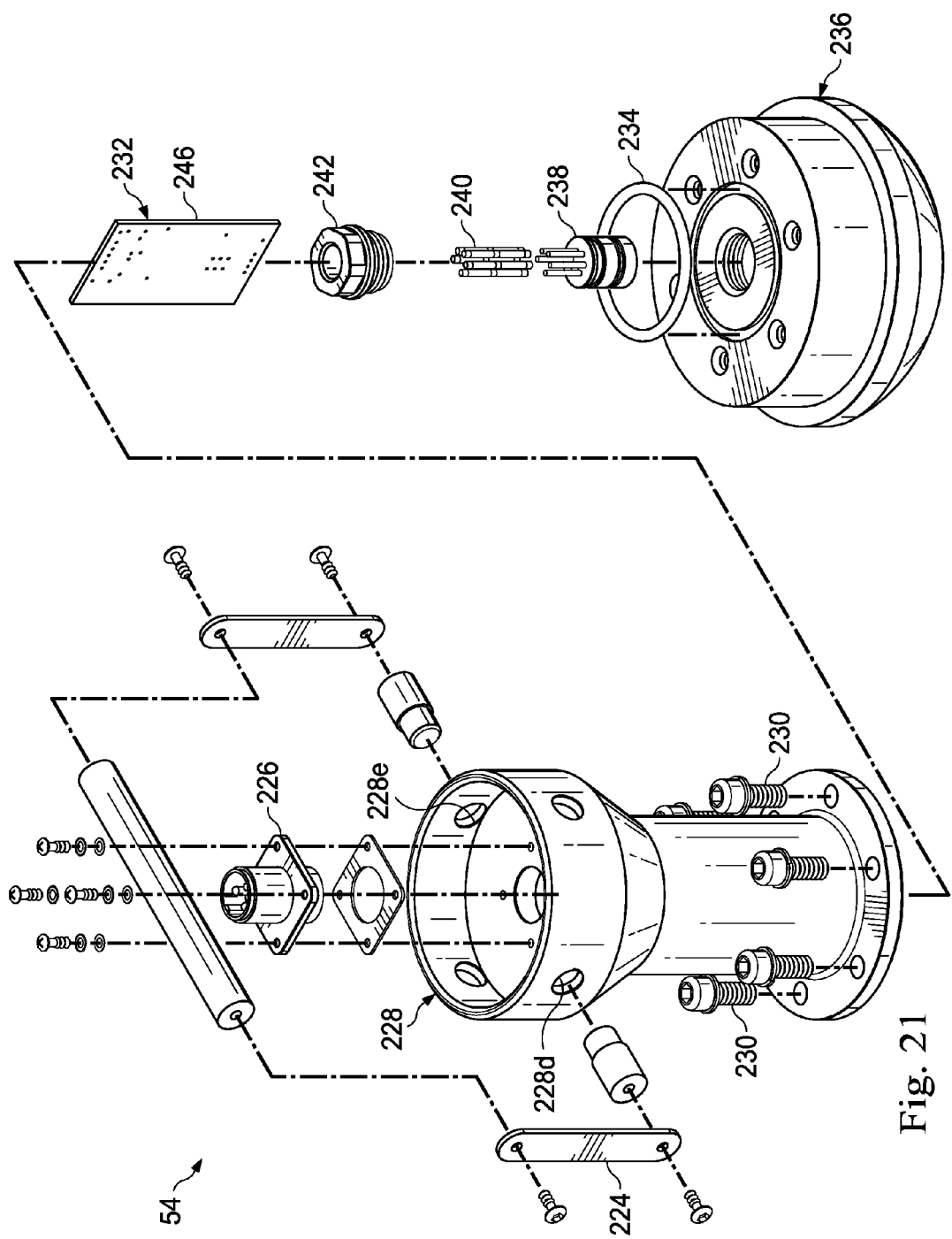
FIG. 21 is an exploded perspective view of the sensor of FIG. 20 according to an exemplary embodiment.
Figure 23:
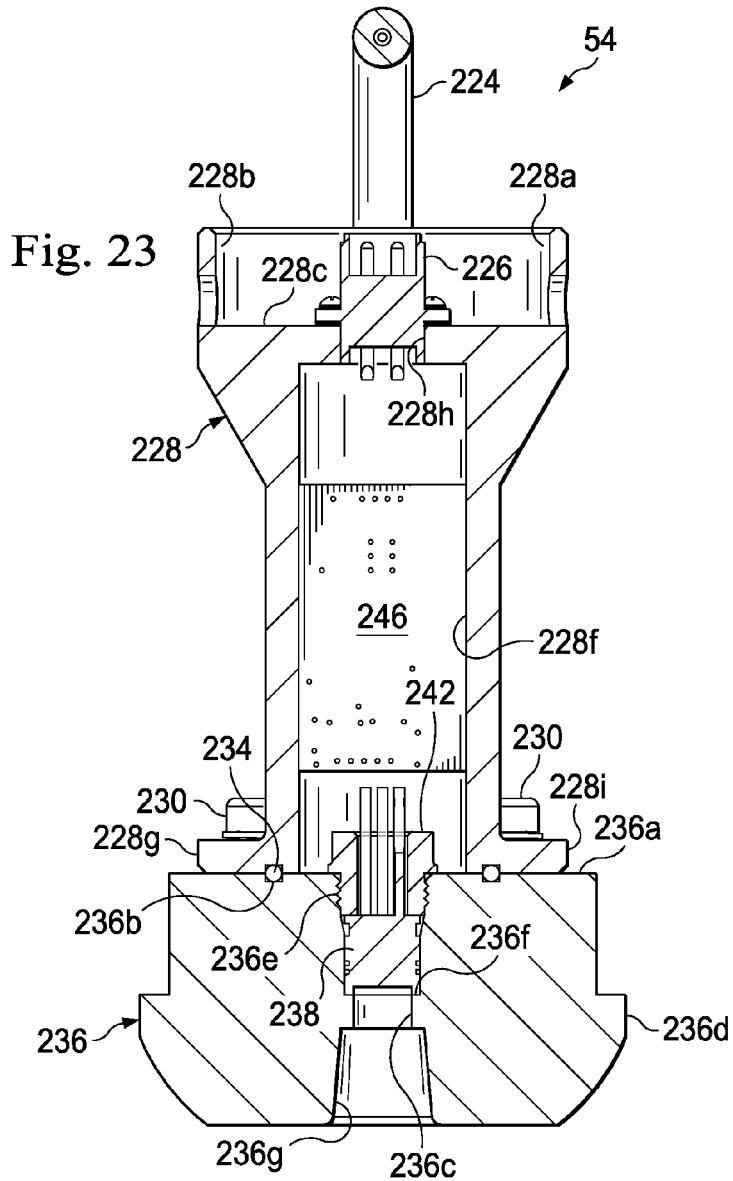
FIG. 23 is a sectional view of the sensor of FIGS. 20 and 21 according to an exemplary embodiment.

As shown in FIGS. 20 and 23, a region 228*a* is formed in an end portion 228*b* of the cover 228. The region 228*a* defines an axially-facing surface 228*c* of the cover 228. Radially-extending bores 228*d* and 228*e* are formed through the cover 228 adjacent the region 228*a*. The handle assembly 224 is connected to the cover 228 using the bores 228*d* and 228*e*, as indicated in FIG. 20. A longitudinally-extending passage 228*f* is formed in the end portion 228*g* that opposes the end portion 228*b*. A bore 228*h* is formed through the surface 228*c* so that the region 228*a* is in fluid communication with the passage 228*f* via the bore 228*h*. The end portion 228*g* includes a flange 228*i*, through which the fasteners 230 extend to connect the cover 228 to the base 236.

The base 236 includes an axial end surface 236*a*, in which an annular groove 236*b* is formed. The O-ring 234 is disposed in the annular groove 236*b* and sealingly engages the flange 228*i*, thereby sealing the connection between the cover 228 and the base 236. A bore 236*c* is formed in the axial end surface 236*a* and through the base 236. An end portion 236*d*, which opposes the axial end surface 236*a*, is shaped in the form of a male hammer union nose. Thus, the end portion 236*d* permits the digital pressure sensor 54 to be operably coupled to the standpipe 62 via a hammer union, which employs the end portion 236*d*. In several exemplary embodiments, instead of a male hammer union nose, the end portion 236*d* may have other shapes, features, elements, etc. to connect the digital pressure sensor 54 to another component so that the digital pressure sensor 54 is operably coupled to the standpipe 62; such other shapes, features, elements, etc. include, but are not limited to, an external threaded connection, an internal threaded connection, or any combination thereof.

As shown or indicated in FIGS. 20, 21, 22 and 23, the connector 226 is connected to the surface 228*c* of the cover 228 and extends within the bore 228*h*. The printed circuit board 246 is disposed in the passage 228*f*. Although not shown in FIG. 23, the cable assembly 248 is disposed in the passage 228*f*. The pressure transducer 238 is disposed in the bore 236*c*. In an exemplary embodiment, the pressure transducer 238 includes one or more O-rings extending thereabout, which sealingly engage inside surfaces of the base 236. The nut 242 is engaged with the axial end surface 236*a*, and threadably engages an internal threaded connection 236*e* formed in the bore 236, thereby engaging the upper portion (as viewed in FIG. 23) of the pressure transducer 238. As a result, the pressure transducer 238 is captured between the nut 242 and an internal shoulder 236*f* defined by the bore 236*c*.

The cable assembly 244 extends through the nut 242. A nozzle 236g is defined by the bore 236 at the end portion 236d.

In operation, in an exemplary embodiment, the pressure transducer 238 measures or senses the pressure at the standpipe 62, and transmits signal(s) corresponding to the sensed pressure to the printed circuit board 246 via the cable assembly 244. Component(s) of the printed circuit board 246 process the received signals and output or transmit digital information corresponding to the sensed pressure to the digital display unit 16 via the cable assembly 248, the connector assembly 226, and the cable assembly 58, in accordance with the foregoing. Before, during and/or after this transmission of digital information, the sensor assembly 232 is electrically powered by the batteries 76a and 76b of the digital display unit 16 via the cable assembly 58 and the connector assembly 226, in accordance with the foregoing.

In view of the foregoing, in several exemplary embodiments, it is clear that the digital pressure sensor 54 of FIGS. 20-23 permits digital sensing or measurement of the pressure at the standpipe 62, without requiring any, or at least significant, modifications to the fluid flow system of which the standpipe 62 is a part. Indeed, as noted above, the digital pressure sensor 54 may be connected using a conventional union arrangement, such as hammer union, so that the digital pressure sensor 54 is operably coupled to the standpipe 62. In several exemplary embodiments, the digital pressure sensor 54 of FIGS. 20-23 enables the use of a digital gauge output, on one or more of the displays 96a, 96b, 96c and 96d of the digital display unit 16, to monitor pressure at the standpipe 62. In several exemplary embodiments, the sensor assembly 232 (including the printed circuit board 246 and the pressure transducer 238) is protected from the environment by the cover 228 and the base 236. In several exemplary embodiments, the connection between the connector assembly 226 and the cable assembly 58 is protected, at least in part, by the portion of the cover 228 surrounding the region 228a; in an exemplary embodiment, a sleeve may be connected to the cover 228 to further protect this connection.

In an exemplary embodiment, the digital pressure sensor 56 is identical to the exemplary embodiment of the digital pressure sensor 54 illustrated in FIGS. 20-23, and therefore neither the digital pressure sensor 56 nor the operation thereof will be described in detail. Instead of being operably coupled to the standpipe 62, the digital pressure sensor 56 is operably coupled to the casing 64, as indicated in FIG. 2. Instead of being connected to, and in electrical communication with, the cable assembly 58, the connector 226 of the digital pressure sensor 56 is connected to, and in electrical communication with, the cable assembly 60, as indicated in FIG. 2.

In several exemplary embodiments, to count the strokes of the pump 50, the digital stroke counter 40 senses the rotation frequency of a magnet rotating on a pump shaft of the pump 50. Likewise, in several exemplary embodiments, to count the strokes of the pump 52, the digital stroke counter 42 senses the rotation frequency of a magnet rotating on a pump shaft of the pump 52. In several exemplary embodiments, each of the digital stroke counters 40 and 42 is, includes, or is part of, a Sensor Solutions® S63B-EHSB-3OCM2 Hall or Magneto Resistive Switch Sensor.

In several exemplary embodiments, each of the digital stroke counters 40 and 42 is a conventional digital stroke counter for a positive displacement drilling fluid (or mud) pump.

In an exemplary embodiment, different components of the choke control panel 10, as well as the system 24, may be color coded to assist in the above-described connections between components. For example, in one exemplary embodiment, the lid 120 of the overlay assembly 66 of the digital display unit 14 may be red in color, the portion of the frame 12 adjacent to where the digital display unit 14 is connected to the frame 12 may be red in color, the connector 106 and/or a connector mounting plate portion to which the cable assembly 36 connects may be red in color, and the cable assembly 36 may be red in color. The lid 120 of the overlay assembly 66 of the digital display unit 16 may be blue in color, the portion of the frame 12 adjacent to where the digital display unit 16 is connected to the frame 12 may be blue in color, a connector equivalent to the connector 106 and/or a connector mounting plate portion to which the cable assembly 58 connects may be blue in color, and the cable assembly 58 may be blue in color. The lid 120 of the overlay assembly 66 of the digital display unit 18 may be green in color, the portion of the frame 12 adjacent to where the digital display unit 18 is connected to the frame 12 may be green in color, a connector equivalent to the connector 106 and/or a connector mounting plate portion to which the cable assembly 60 connects may be green in color, and the cable assembly 60 may be green in color. The lid 120 of the overlay assembly 66 of the digital display unit 20 may be yellow in color, the portion of the frame 12 adjacent to where the digital display unit 20 is connected to the frame 12 may be yellow in color, a connector equivalent to the connector 106 and/or a connector mounting plate portion to which the cable assembly 46 connects may be yellow in color, and the cable assembly 46 may be yellow in color.

In several exemplary embodiments, one or more of the digital display units 14, 16, 18 and 20 may be operably coupled to the hydraulic control equipment 22 so that the hydraulic control equipment 22 automatically controls the hydraulic choke 26 and/or 28 based on the digital information received and processed by the one or more digital display units 14, 16, 18 and 20. In an exemplary embodiment, the hydraulic chokes 26 and 28 are so controlled using one or more programmable logic controllers (PLCs).

In several exemplary embodiments, one of the hydraulic chokes 26 and 28 may be omitted; in several exemplary embodiments, the digital display unit 14 may be modified to display operation parameter(s) for a single hydraulic choke. In several exemplary embodiments, one of the pumps 50 and 52 may be omitted; in several exemplary embodiments, the digital display unit 20 may be modified to display operation parameter(s) for a single pump.

In several exemplary embodiments, one or more of the digital display units 14, 16, 18 and 20 may be omitted from the choke control panel 10. In several exemplary embodiments, one or more additional digital display units that are either identical to one or more of the digital display units 14, 16, 18 and 20, or identical except for one or more different switches and/or graphic overlays, may be added to the choke control panel 10.

In several exemplary embodiments, instead of, or in addition to being used to monitor and/or control (automatically or otherwise) systems or components in the system 24 for drilling an oil or gas well, the choke control panel 10, one or more components of the choke control panel 10, including one or more of the digital display units 14, 16, 18 and 20, or one or more features thereof, may be used to monitor and/or control (automatically or otherwise) systems or components in other systems such as, for example, mud-gas separator systems.

In several exemplary embodiments, all electrical communication, digital information transmission, electrical power transmission, etc. described herein via specified components (such as specific connectors and specific cable assemblies) are not limited to those specified components, and any such communication and transmission may occur via other components in addition to, or instead of, those specified components, and/or via a subset of one or more of those specified components.

Figure 24:
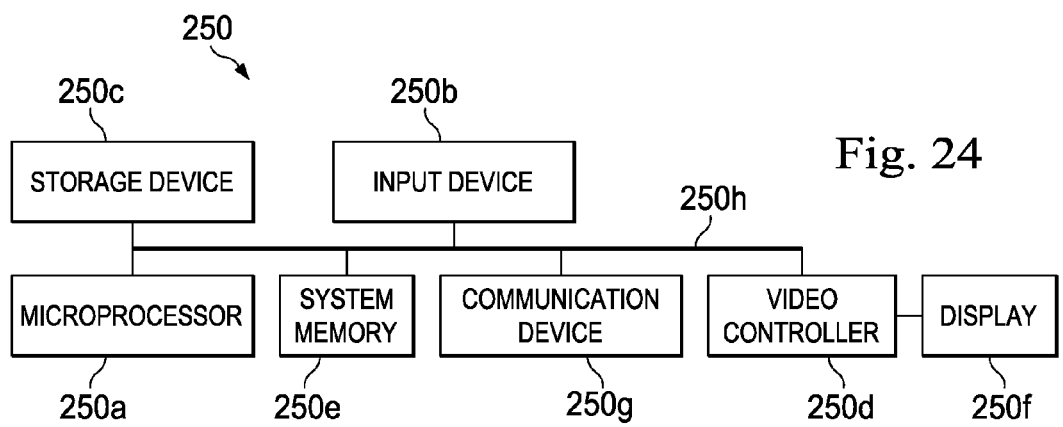
FIG. 24 is a diagrammatic illustration of a node for implementing one or more exemplary embodiments of the present disclosure, according to an exemplary embodiment.

In an exemplary embodiment, as illustrated in FIG. 24 with continuing reference to FIGS. 1-23, an illustrative node 250 for implementing one or more of the above-described exemplary embodiments is depicted. The node 250 includes a microprocessor 250a, an input device 250b, a storage device 250c, a video controller 250d, a system memory 250e, a display 250f, and a communication device 250g all interconnected by one or more buses 250h. In several exemplary embodiments, the storage device 250c may include a floppy drive, hard drive, CD-ROM, optical drive, any other form of storage device and/or any combination thereof. In several exemplary embodiments, the storage device 250c may include, and/or be capable of receiving, a floppy disk, CD-ROM, DVD-ROM, or any other form of computer-readable medium that may contain executable instructions. In several exemplary embodiments, the communication device 250g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the choke control panel 10 or the system 24 include at least the node 250 and/or components thereof, and/or one or more nodes that are substantially similar to the node 250 and/or components thereof. In several exemplary embodiments, one or more of the above-described components of the node 250 and/or the system 10 include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems. In an exemplary embodiment, a computer system may include a programmable logic controller (PLC).

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example. In an exemplary embodiment, hardware may include a programmable logic controller (PLC).

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine, server, or programmable logic controller (PLC).

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the choke control panel 10 or components thereof, the system 24 or components thereof, and/or any combination thereof. In several exemplary embodiments, such a processor may include any of the microcontrollers 94, any processor(s) that are part of the components of the choke control panel 10 or the system 24, and/or any combination thereof, and such a computer readable medium may be distributed among one or more components of the choke control panel 10 or the system 24. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A system, comprising:
a frame;
a first digital display unit connected to the frame, the first digital display unit comprising:
a first microcontroller to process digital information received from one or more sensors in a plurality of sensors;
a first display in electrical communication with the first microcontroller; and
a first switch in electrical communication with the first microcontroller so that, when the first microcontroller receives digital information from the one or more sensors in the plurality of sensors, the first microcontroller recognizes a first type of sensor from which the first microcontroller either is, or at least should be, receiving the digital information and displays a first output on the first display that is specific to the recognized first type of sensor;
a second digital display unit connected to the frame, the second digital display unit comprising:
a second microcontroller to process digital information received from one or more other sensors in the plurality of sensors;
a second display in electrical communication with the second microcontroller; and
a second switch in electrical communication with the second microcontroller so that, when the second microcontroller receives the digital information from the one or more other sensors in the plurality of sensors, the second microcontroller recognizes a second type of sensor from which the second microcontroller either is, or at least should be, receiving the digital information;
wherein the second type of sensor is different from the first type of sensor, the second switch is different from the first switch, and the second microcontroller displays a second output on the second display that is specific to the recognized second type of sensor and thus different from the first output;
wherein the first type of sensor is a digital hydraulic choke position sensor, the second type of sensor is one of a digital pressure sensor and a digital stroke counter, and the frame and the first and second digital display units are part of a choke control panel;
wherein the first output comprises a value corresponding to the degree to which a hydraulic choke is open or closed; and
wherein the second output comprises one of a pressure value and a stroke rate; and
a digital choke position sensor assembly adapted to determine the choke position of the hydraulic choke, the hydraulic choke comprising a rod, the digital choke position sensor assembly being of the first type of sensor and comprising:
a housing adapted to be connected to the hydraulic choke, the housing defining a longitudinally-extending passage; and
a digital position sensor disposed in the longitudinally-extending passage to sense movement of the rod and output digital information corresponding to the sensed movement;
wherein the digital position sensor is adapted to be in electrical communication with the first microcontroller.

2. A system, comprising:
a frame;
a first digital display unit connected to the frame, the first digital display unit comprising:
a first microcontroller to process digital information received from one or more sensors in a plurality of sensors;
a first display in electrical communication with the first microcontroller; and
a first switch in electrical communication with the first microcontroller so that, when the first microcontroller receives digital information from the one or more sensors in the plurality of sensors, the first microcontroller recognizes a first type of sensor from which the first microcontroller either is, or at least should be, receiving the digital information and displays a first output on the first display that is specific to the recognized first type of sensor;
a second digital display unit connected to the frame, the second digital display unit comprising:
a second microcontroller to process digital information received from one or more other sensors in the plurality of sensors;
a second display in electrical communication with the second microcontroller; and
a second switch in electrical communication with the second microcontroller so that, when the second microcontroller receives the digital information from the one or more other sensors in the plurality of sensors, the second microcontroller recognizes a second type of sensor from which the second microcontroller either is, or at least should be, receiving the digital information;

wherein the second type of sensor is different from the first type of sensor, the second switch is different from the first switch, and the second microcontroller displays a second output on the second display that is specific to the recognized second type of sensor and thus different from the first output;

wherein the first type of sensor is a digital hydraulic choke position sensor;

wherein the frame and the first and second digital display units are part of a choke control panel; and wherein the second type of sensor is a digital pressure sensor; and a digital pressure sensor assembly being of the second type of sensor, the digital pressure sensor assembly comprising:
  a cover comprising first and second opposing end portions;
  a longitudinally-extending passage formed in the first end portion;
  a connector located at the second end portion and in electrical communication with the second microcontroller; and
  a pressure transducer adapted to be in electrical communication with the connector; and
  a plurality of components via which the pressure transducer is in electrical communication with the connector, wherein the components extend within the longitudinally-extending passage.

3. The system of claim 1, wherein the first digital display unit comprises a first enclosure and a first lid assembly connected thereto, the first lid assembly comprising the first microcontroller, the first display, and the first switch; and
  wherein the second digital display unit comprises a second enclosure and a second lid assembly connected thereto, the second lid assembly comprising the second microcontroller, the second display, and the second switch.

4. The system of claim 3, wherein the second microcontroller is identical to the first microcontroller;
  wherein the second enclosure is identical to the first enclosure; and
  wherein the second display is identical to the first display.

5. The system of claim 3, wherein the first and second lid assemblies are interchangeable between the first and second enclosures so that, when the first and second lid assemblies are interchanged:
  the first digital display unit comprises the first enclosure and the second lid assembly connected thereto, and
  the second digital display unit comprises the second enclosure and the first lid assembly connected thereto.

6. The system of claim 1, wherein the first digital display unit comprises a first electrical power source in electrical communication with the first microcontroller to supply electrical power thereto;
  wherein the second digital display unit comprises a second electrical power source in electrical communication with the second microcontroller to supply electrical power thereto; and
  wherein the second electrical power source is independent of the first electrical power source.

7. The system of claim 6, further comprising:
  the plurality of sensors;
  wherein the first electrical power source is in electrical communication with the one or more sensors to supply electric power thereto; and
  wherein the second electrical power source is in electrical communication with the one or more other sensors to supply electrical power thereto.

8. A kit, comprising:
a plurality of enclosures;
a plurality of lid assemblies, each lid assembly in the plurality of lid assemblies being connectable to each enclosure in the plurality of enclosures;
  wherein each lid assembly comprises:
    a microcontroller; and
    a display in electrical communication with the microcontroller;
  wherein the respective microcontrollers of the lid assemblies are identical to one another;
  wherein each lid assembly comprises a switch in electrical communication with the corresponding microcontroller of the lid assembly;
  wherein each one of the switches is different from the other switches so that, when the lid assemblies are connected to the enclosures, respectively, and each of the microcontrollers receives digital information from one or more sensors in a plurality of sensors:
    at least one of the switches causes the corresponding microcontroller to recognize a first type of sensor from which the microcontroller either is, or at least should be, receiving the digital information and displays a first output on the corresponding display that is specific to the recognized first type of sensor; and
    at least one other of the switches causes the corresponding microcontroller to recognize a second type of sensor from which the microcontroller either is, or at least should be, receiving the digital information and displays a second output on the corresponding display that is specific to the recognized second type of sensor;
  wherein the second type of sensor is different from the first type of sensor and the second output is different from the first output;
  wherein the first type of sensor is a digital hydraulic choke position sensor, the second type of sensor is one of a digital pressure sensor and a digital stroke counter, and the frame and the first and second digital display units are part of a choke control panel;
  wherein the first output comprises a value corresponding to the degree to which a hydraulic choke is open or closed; and
  wherein the second output comprises one of a pressure value and a stroke rate; and
a digital choke position sensor assembly adapted to determine the choke position of the hydraulic choke, the hydraulic choke comprising a rod, the digital hydraulic choke position sensor assembly being of the first type of sensor and comprising:
  a housing adapted to be connected to the hydraulic choke, the housing defining a longitudinally-extending passage; and
  a digital position sensor disposed in the longitudinally-extending passage to sense movement of the rod and output digital information corresponding to the sensed movement;
  wherein the digital position sensor is adapted to be in electrical communication with one of the microcontrollers.

9. A kit, comprising:
a plurality of enclosures;

a plurality of lid assemblies, each lid assembly in the plurality of lid assemblies being connectable to each enclosure in the plurality of enclosures;
   wherein each lid assembly comprises:
      a microcontroller; and
      a display in electrical communication with the microcontroller;
   wherein the respective microcontrollers of the lid assemblies are identical to one another;
   wherein each lid assembly comprises a switch in electrical communication with the corresponding microcontroller of the lid assembly; and
   wherein each one of the switches is different from the other switches so that, when the lid assemblies are connected to the enclosures, respectively, and each of the microcontrollers receives digital information from one or more sensors in a plurality of sensors:
      at least one of the switches causes the corresponding microcontroller to recognize a first type of sensor from which the microcontroller either is, or at least should be, receiving the digital information and displays a first output on the corresponding display that is specific to the recognized first type of sensor; and
      at least one other of the switches causes the corresponding microcontroller to recognize a second type of sensor from which the microcontroller either is, or at least should be, receiving the digital information and displays a second output on the corresponding display that is specific to the recognized second type of sensor
   wherein the second type of sensor is different from the first type of sensor and the second output is different from the first output;
   wherein the first type of sensor is a digital hydraulic choke position sensor;
   wherein the frame and the first and second digital display units are part of a choke control panel; and
   wherein the second type of sensor is a digital pressure sensor; and
a digital pressure sensor assembly being of the second type of sensor, the digital pressure sensor assembly comprising:
   a cover comprising first and second opposing end portions;
   a longitudinally-extending passage formed in the first end portion;
   a connector located at the second end portion and adapted to be in electrical communication with one of the microcontrollers;
   a pressure transducer in electrical communication with the connector; and
   a plurality of components via which the pressure transducer is in electrical communication with the connector, wherein the components extend within the longitudinally-extending passage.

10. The system of claim 2, wherein the first digital display unit comprises a first enclosure and a first lid assembly connected thereto, the first lid assembly comprising the first microcontroller, the first display, and the first switch; and
   wherein the second digital display unit comprises a second enclosure and a second lid assembly connected thereto, the second lid assembly comprising the second microcontroller, the second display, and the second switch.

11. The system of claim 10, wherein the second microcontroller is identical to the first microcontroller;
   wherein the second enclosure is identical to the first enclosure; and
   wherein the second display is identical to the first display.

12. The system of claim 10, wherein the first and second lid assemblies are interchangeable between the first and second enclosures so that, when the first and second lid assemblies are interchanged:
   the first digital display unit comprises the first enclosure and the second lid assembly connected thereto, and
   the second digital display unit comprises the second enclosure and the first lid assembly connected thereto.

13. The system of claim 2, wherein the first digital display unit comprises a first electrical power source in electrical communication with the first microcontroller to supply electrical power thereto;
   wherein the second digital display unit comprises a second electrical power source in electrical communication with the second microcontroller to supply electrical power thereto; and
   wherein the second electrical power source is independent of the first electrical power source.

14. The system of claim 13, further comprising:
   the plurality of sensors;
   wherein the first electrical power source is in electrical communication with the one or more sensors to supply electric power thereto; and
   wherein the second electrical power source is in electrical communication with the one or more other sensors to supply electrical power thereto.

\* \* \* \* \*